(12) United States Patent
Boorman et al.

(10) Patent No.: US 7,945,354 B2
(45) Date of Patent: May 17, 2011

(54) APPARATUSES AND METHODS FOR DISPLAYING AND RECEIVING TACTICAL AND STRATEGIC FLIGHT GUIDANCE INFORMATION

(75) Inventors: Daniel J. Boorman, Woodinville, WA (US); John C. Griffin, III, University Place, WA (US); Peter D. Gunn, Bellevue, WA (US); Randall J. Mumaw, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/825,135

(22) Filed: Jun. 28, 2010

(65) Prior Publication Data

US 2010/0262358 A1 Oct. 14, 2010

Related U.S. Application Data

(62) Division of application No. 11/639,791, filed on Dec. 14, 2006, now Pat. No. 7,751,948, which is a division of application No. 10/746,912, filed on Dec. 24, 2003, now Pat. No. 7,188,007.

(51) Int. Cl.
*G01C 23/00* (2006.01)
(52) U.S. Cl. .................. 701/3; 701/4; 701/14; 340/945
(58) Field of Classification Search .................. 701/3, 4, 701/8, 13, 14; 244/75.1, 118.5; 340/945, 340/980
See application file for complete search history.

(56) References Cited

U.S. PATENT DOCUMENTS

| 3,191,147 | A | | 6/1965 | Majendie |
| 3,696,671 | A | | 10/1972 | Steigleder et al. |
| 3,825,180 | A | * | 7/1974 | Gallagher .................. 235/78 R |
| 3,848,833 | A | | 11/1974 | Rauschelbach |

(Continued)

FOREIGN PATENT DOCUMENTS

DE 3315386 A 10/1984

(Continued)

OTHER PUBLICATIONS

777 Flight Deck (1 page); http://www.meriweather.com/777/777_main.html; [Accessed Jan. 28, 2003].
Deltasoft, F-15 Cockpit, Aug. 2001, <http://web.archive.org/web/20010803031953/http://deltasoft.fife.wa.us/cockpit.htm> accessed Aug. 14, 2007.

(Continued)

*Primary Examiner* — Gertrude Arthur Jeanglaud
(74) *Attorney, Agent, or Firm* — Perkins Coie LLP

(57) ABSTRACT

Methods and apparatuses for displaying and receiving tactical and strategic flight guidance information are disclosed. A method in accordance with one aspect of the invention includes displaying at least one first indicator to an operator of the aircraft, with a first indicator corresponding to a first instruction input by the operator for directing a first aircraft behavior and implemented upon receiving an activation instruction from the operator. At least one second indicator corresponding to a second instruction for directing a second aircraft behavior at least proximately the same as the first aircraft behavior is displayed, with the at least one second instruction to be automatically implemented at a future time. The at least one second indicator is at least approximately the same as the at least one first indicator. Indicators can be hierarchically organized to simplify presentation and reduce pilot training time.

20 Claims, 16 Drawing Sheets

U.S. PATENT DOCUMENTS

| | | | |
|---|---|---|---|
| 3,967,098 A | 6/1976 | Harnagel | |
| 4,035,705 A | 7/1977 | Miller | |
| 4,196,474 A | 4/1980 | Buchanan et al. | |
| 4,212,064 A | 7/1980 | Forsythe et al. | |
| 4,224,669 A | 9/1980 | Brame | |
| 4,247,843 A | 1/1981 | Miller et al. | |
| 4,274,096 A | 6/1981 | Dennison | |
| 4,325,123 A | 4/1982 | Graham et al. | |
| 4,424,038 A | 1/1984 | Tingleff et al. | |
| 4,471,439 A | 9/1984 | Robbins et al. | |
| H000139 H | 10/1986 | Task | |
| 4,631,678 A | 12/1986 | Angermuller et al. | |
| 4,642,775 A | 2/1987 | Cline | |
| 4,729,102 A | 3/1988 | Miller, Jr. et al. | |
| 4,792,906 A | 12/1988 | King et al. | |
| 4,860,007 A | 8/1989 | Konicke et al. | |
| 4,939,661 A | 7/1990 | Barker et al. | |
| 5,050,081 A | 9/1991 | Abbott et al. | |
| 5,070,458 A | 12/1991 | Gilmore et al. | |
| 5,072,218 A | 12/1991 | Spero et al. | |
| 5,222,691 A | 6/1993 | Gold et al. | |
| 5,238,203 A | 8/1993 | Skonieczny et al. | |
| 5,243,339 A | 9/1993 | Graham et al. | |
| 5,289,185 A | 2/1994 | Ramier et al. | |
| 5,310,135 A | 5/1994 | Fowler et al. | |
| 5,310,136 A | 5/1994 | Fowler et al. | |
| 5,329,277 A | 7/1994 | Dougan et al. | |
| 5,337,982 A | 8/1994 | Sherry | |
| 5,416,705 A | 5/1995 | Barnett | |
| 5,420,582 A | 5/1995 | Kubbat et al. | |
| 5,454,074 A | 9/1995 | Hartel et al. | |
| 5,475,594 A | 12/1995 | Oder et al. | |
| 5,499,025 A | 3/1996 | Middleton et al. | |
| 5,508,928 A | 4/1996 | Tran | |
| 5,519,392 A | 5/1996 | Oder et al. | |
| 5,523,949 A | 6/1996 | Agate et al. | |
| 5,668,542 A | 9/1997 | Wright | |
| 5,715,163 A | 2/1998 | Bang et al. | |
| 5,736,955 A | 4/1998 | Roif | |
| 5,739,769 A | 4/1998 | Vladimir et al. | |
| 5,746,392 A | 5/1998 | Gast | |
| 5,798,712 A | 8/1998 | Coquin et al. | |
| 5,802,492 A | 9/1998 | DeLorme et al. | |
| 5,803,408 A | 9/1998 | Gast | |
| 5,844,503 A | 12/1998 | Riley et al. | |
| 5,875,998 A | 3/1999 | Gleine et al. | |
| 5,884,219 A | 3/1999 | Curtwright et al. | |
| 5,916,297 A | 6/1999 | Griffin, III et al. | |
| 5,940,013 A | 8/1999 | Vladimir et al. | |
| 5,941,930 A | 8/1999 | Morimoto et al. | |
| 5,971,318 A | 10/1999 | Lustre | |
| 5,978,715 A | 11/1999 | Briffe et al. | |
| 5,983,158 A | 11/1999 | Suzuki et al. | |
| 5,995,290 A | 11/1999 | Noble | |
| 5,995,901 A | 11/1999 | Owen et al. | |
| 6,038,498 A | 3/2000 | Briffe et al. | |
| 6,057,786 A | 5/2000 | Briffe et al. | |
| 6,067,502 A | 5/2000 | Hayashida et al. | |
| 6,072,473 A | 6/2000 | Muller et al. | |
| 6,075,467 A | 6/2000 | Ninagawa et al. | |
| 6,085,129 A | 7/2000 | Schardt et al. | |
| 6,098,014 A | 8/2000 | Kranz | |
| 6,112,141 A | 8/2000 | Briffe et al. | |
| 6,118,385 A | 9/2000 | Leard et al. | |
| 6,128,553 A | 10/2000 | Gordon et al. | |
| 6,154,151 A | 11/2000 | McElreath et al. | |
| 6,175,315 B1 | 1/2001 | Millard et al. | |
| 6,181,987 B1 | 1/2001 | Deker et al. | |
| 6,188,937 B1 | 2/2001 | Sherry et al. | |
| 6,246,320 B1 | 6/2001 | Monroe | |
| 6,262,720 B1 | 7/2001 | Jeffrey et al. | |
| 6,275,172 B1 | 8/2001 | Curtis et al. | |
| 6,278,913 B1 | 8/2001 | Jiang et al. | |
| 6,313,759 B1 | 11/2001 | Musland-Sipper | |
| 6,314,343 B1 | 11/2001 | Adams et al. | |
| 6,314,366 B1 | 11/2001 | Farmakis et al. | |
| 6,314,370 B1 | 11/2001 | Curtright | |
| 6,328,265 B1 | 12/2001 | Dizdarevic | |
| 6,335,694 B1 | 1/2002 | Beksa et al. | |
| 6,346,892 B1 | 2/2002 | DeMers et al. | |
| 6,362,750 B1 | 3/2002 | Castor et al. | |
| 6,381,519 B1 | 4/2002 | Snyder | |
| 6,381,538 B1 | 4/2002 | Robinson et al. | |
| 6,389,333 B1 | 5/2002 | Hansman et al. | |
| 6,405,975 B1 | 6/2002 | Sankrithi et al. | |
| 6,424,909 B2 | 7/2002 | Kusano et al. | |
| 6,443,394 B1 | 9/2002 | Weisend, Jr. | |
| 6,443,399 B1 | 9/2002 | Yout | |
| 6,449,556 B1 | 9/2002 | Pauly | |
| 6,466,235 B1 | 10/2002 | Smith et al. | |
| 6,470,224 B1 | 10/2002 | Drake et al. | |
| 6,473,675 B2 | 10/2002 | Sample | |
| 6,512,527 B1 | 1/2003 | Barber et al. | |
| 6,522,958 B1 | 2/2003 | Dwyer et al. | |
| 6,542,796 B1 | 4/2003 | Gibbs et al. | |
| 6,556,902 B2 | 4/2003 | Ing et al. | |
| 6,606,563 B2 | 8/2003 | Corcoran, III | |
| 6,614,419 B1 | 9/2003 | May | |
| 6,633,810 B1 | 10/2003 | Qureshi et al. | |
| 6,636,786 B2 | 10/2003 | Partel | |
| 6,668,215 B2 | 12/2003 | Lafon et al. | |
| 6,690,299 B1 | 2/2004 | Suiter | |
| 6,693,559 B1 | 2/2004 | Gyde et al. | |
| 6,696,980 B1 | 2/2004 | Langner et al. | |
| 6,697,718 B2 | 2/2004 | Le Draoullec et al. | |
| 6,707,387 B2 | 3/2004 | Noguchi et al. | |
| 6,707,475 B1 | 3/2004 | Snyder | |
| 6,711,475 B2 | 3/2004 | Murphy | |
| 6,720,891 B2 | 4/2004 | Chen et al. | |
| 6,721,640 B2 | 4/2004 | Glenn et al. | |
| 6,745,113 B2 | 6/2004 | Griffin, III et al. | |
| 6,784,869 B1 | 8/2004 | Clark et al. | |
| 6,812,858 B2 | 11/2004 | Griffin, III | |
| 6,816,780 B2 | 11/2004 | Naimer et al. | |
| 6,856,864 B1 | 2/2005 | Gibbs et al. | |
| 6,870,490 B2 | 3/2005 | Sherry et al. | |
| 6,871,124 B1 | 3/2005 | McElreath | |
| 6,897,790 B2 | 5/2005 | Orton | |
| 6,898,492 B2 | 5/2005 | De Leon | |
| 6,909,967 B2 | 6/2005 | Hirano et al. | |
| 6,915,190 B2 | 7/2005 | Galasso | |
| 6,934,608 B2 | 8/2005 | Qureshi | |
| 6,946,976 B1 | 9/2005 | Langner et al. | |
| 6,980,198 B1 | 12/2005 | Gyde et al. | |
| 6,992,596 B2 | 1/2006 | Cole et al. | |
| 6,992,597 B2 | 1/2006 | Rogers et al. | |
| 7,030,892 B1 | 4/2006 | Gyde et al. | |
| 7,072,746 B1 | 7/2006 | Burch | |
| 7,103,455 B2 | 9/2006 | Subelet et al. | |
| 7,142,131 B2 | 11/2006 | Sikora | |
| 7,148,814 B2 | 12/2006 | Sikora et al. | |
| 7,177,731 B2 | 2/2007 | Sandell et al. | |
| 7,188,007 B2 | 3/2007 | Boorman et al. | |
| 7,203,577 B2 | 4/2007 | Gunn et al. | |
| 7,216,069 B2 | 5/2007 | Hett | |
| 7,222,017 B2 | 5/2007 | Clark et al. | |
| 7,230,632 B2 | 6/2007 | Coldefy et al. | |
| 7,256,710 B2 | 8/2007 | Griffin, III et al. | |
| 7,321,318 B2 | 1/2008 | Crane et al. | |
| 7,363,119 B2 | 4/2008 | Griffin, III et al. | |
| 7,418,319 B2 | 8/2008 | Chen et al. | |
| 7,460,029 B2 | 12/2008 | Boorman et al. | |
| 7,577,501 B2 | 8/2009 | Tafs et al. | |
| 7,751,948 B2 | 7/2010 | Boorman et al. | |
| 2002/0033837 A1 | 3/2002 | Munro | |
| 2002/0111740 A1* | 8/2002 | Horvath et al. | 701/302 |
| 2003/0025719 A1 | 2/2003 | Palmer et al. | |
| 2003/0132860 A1 | 7/2003 | Feyereisen et al. | |
| 2003/0225492 A1 | 12/2003 | Cope et al. | |
| 2004/0006412 A1 | 1/2004 | Doose et al. | |
| 2004/0059474 A1 | 3/2004 | Boorman et al. | |
| 2005/0178903 A1 | 8/2005 | Boorman et al. | |
| 2005/0182528 A1 | 8/2005 | Dwyer et al. | |
| 2005/0203675 A1 | 9/2005 | Griffin et al. | |
| 2005/0228674 A1 | 10/2005 | Gunn et al. | |
| 2005/0231390 A1 | 10/2005 | Crane et al. | |
| 2005/0283305 A1 | 12/2005 | Clark et al. | |

| | | | |
|---|---|---|---|
| 2006/0004496 | A1 | 1/2006 | Tucker et al. |
| 2006/0005147 | A1 | 1/2006 | Hammack et al. |
| 2008/0091311 | A1 | 4/2008 | Boorman et al. |
| 2009/0062972 | A1 | 3/2009 | Boorman |
| 2010/0076627 | A1 | 3/2010 | Boorman et al. |

FOREIGN PATENT DOCUMENTS

| | | |
|---|---|---|
| EP | 0 286 120 | 10/1988 |
| EP | 0 370 640 | 5/1990 |
| EP | 0 489 521 | 6/1992 |
| EP | 1273987 | 1/2003 |
| FR | 2817831 | 6/2002 |
| FR | 2848306 | 6/2004 |
| GB | 886136 | 1/1962 |
| WO | WO-02/24530 | 3/2002 |
| WO | WO-04/027732 | 4/2004 |

OTHER PUBLICATIONS

Hutchins, Edwin, "The Integrated Mode Management Interface," Department of Cognitive Science, University of California, San Diego, Sep. 17, 1996.

Lindenfeld, "What is an FMS?", Flight Management Systems (5 pages); http:://www.ultranet.com/~marzgold//FAQ-FMS.html [Accessed Jun. 3, 2002].

Meriweather's Flight Deck Acronyms & Definitions (4 pages); http://www.meriweather.com/fd/def.html; [Accessed Jun. 3, 2002].

Painter et al., "Decision Support for the General Aviation Pilot," Systems, Man, and Cybernetics, IEEE International Conference on Computational Cybernetics and Simulation, Orlando, FL, Oct. 12-15, 1997, pp. 88-93.

\* cited by examiner

| LATERAL MOTION MODES | VERTICAL MOTION MODES |
|---|---|
| LNAV | TO/GA |
| TRK SEL | VNAV SPD |
| TRK HOLD | FLCH SPD |
| LOC | V/S |
| TO/GA | VNAV PTH |
|  | G/S |
| HDG SEL | FPA |
| HDG HOLD |  |
|  | VNAV ALT |
| ATT | ALT |
|  |  |
| ROLLOUT | FLARE |

APPARATUSES AND METHODS FOR DISPLAYING AND RECEIVING TACTICAL AND STRATEGIC FLIGHT GUIDANCE INFORMATION

This application is a divisional U.S. patent application Ser. No. 11/639,791 filed Dec. 14, 2006, entitled APPARATUSES AND METHODS FOR DISPLAYING AND RECEIVING TACTICAL AND STRATEGIC FLIGHT GUIDANCE INFORMATION, which is a divisional of U.S. patent application Ser. No. 10/746,912 filed on Dec. 24, 2003, now U.S. Pat. No. 7,188,007 issued Mar. 6, 2007, which is incorporated by reference herein in its entirety.

TECHNICAL FIELD

The following disclosure relates generally to aircraft flight guidance systems and to apparatuses and methods for displaying and receiving tactical and strategic flight guidance information.

BACKGROUND

Aircraft autoflight systems have evolved over the years from the traditional autopilots for basic flight path control to complex flight management systems capable of automatically flying aircraft over complicated routes without pilot intervention. Such flight management systems typically include an autopilot, an autothrottle, and a flight management computer (FMC) interfaced with the autopilot and autothrottle. Flight decks on aircraft utilizing such systems generally include a number of controls and displays that allow pilots to monitor the flight management system and change autoflight parameters if desired. As flight management systems have evolved, these controls and displays have been positioned in different locations around the flight deck. Over time, these locations have become somewhat standardized within the transport aircraft industry.

FIG. 1A illustrates an aircraft flight deck 20 having a flight management system in accordance with the prior art. The flight deck 20 includes a first pilot seat 24a and a second pilot seat 24b, separated by a control pedestal 26. Forward windows 21 are positioned forward of the seats 24a, 24b and provide a forward field of view for the pilots (not shown) seated in the pilot seats 24a, 24b. A plurality of flight instruments 27 are positioned on a forward instrument panel 23 and the control pedestal 26 for access by the pilots. A glare shield 22 is positioned below the forward windows 21 to reduce glare on the flight instruments 27.

The flight instruments 27 can include a number of autoflight controls and displays, including a first control display unit (CDU) 28a positioned on the control pedestal 26 adjacent to the first pilot seat 24a, and a second CDU 28b positioned on the control pedestal 26 adjacent to the second pilot seat 24b. The first and second CDUs 28a, 28b allow the pilots to make data entries into a flight management computer (FMC) for controlling the flight management system. These entries can include flight plan information, e.g., strategic navigation and flight profile parameters. The flight instruments 27 can also include a first primary flight display (PFD) 25a positioned on the forward instrument panel 23 in front of the first pilot seat 24a, and a second PFD 25b positioned on the forward instrument panel 23 in front of the second pilot seat 24b. The first and second PFDs 24a, 25b display actual flight parameters of the aircraft, such as airspeed, altitude, attitude and heading. In addition, the first and second PFDs 25a, 25b can also display conventional flight mode annunciators (FMAs). FMAs are textual shorthand codes indicating the current modes of the autothrottle and autopilot. The flight deck 20 can further include a mode control panel (MCP) 30 incorporated into the glare shield 22. The MCP 30 provides control input devices for the FMC, autothrottle, autopilot, flight director, and altitude alert systems.

FIG. 1B illustrates a list 90 of existing FMAs corresponding to instructions for automatically controlling the lateral motion and vertical motion of an aircraft, in accordance with the prior art. As shown in FIG. 1B, existing arrangements can include at least nine different lateral modes and at least ten different vertical modes for controlling the motion of the aircraft. Furthermore, the same aircraft flight path control may be annunciated by different FMAs depending on whether the annunciation originates from the MCP 30 or the FMC. Still further, a given FMA may represent very different flight path controls, depending on flight conditions and/or the state of the aircraft's autoflight system.

One characteristic of the foregoing arrangement is that it is relatively complex. A potential drawback with this characteristic is that it can be time consuming and therefore expensive to train flight crews in the use of this system. As a result, the overall cost of operating the aircraft increases, which in turn increases the cost of transporting passengers and goods by air.

SUMMARY

The present invention is directed generally toward methods and apparatuses for controlling aircraft. A computer-implemented method in accordance with one aspect of the invention includes displaying at least one indicator to an operator of an aircraft, with the at least one indicator corresponding to at least one first instruction input by the operator for directing a first aircraft behavior and implemented upon receiving an activation instruction from the operator. The method can further include displaying at least one second indicator to the operator, the at least one second indicator corresponding to at least one second instruction for directing a second aircraft behavior at least approximately the same as the first aircraft behavior. The at least one second instruction is to be automatically implemented at a future time and is at least approximately the same as the at least one first indicator.

The indicators can correspond to maneuvers conducted by the aircraft, with at least generally similar maneuvers having at least approximately the same indicators, whether they are to be implemented imminently or at a future time. The indicators can correspond to lateral motion, vertical motion, or air speed of the aircraft and can be automatically implemented or manually implemented by the operator.

A method in accordance with another aspect of the invention includes presenting a plurality of first level options for controlling an aspect of the aircraft's motion, with at least one of the first level options having associated with it a plurality of second level options. A first input corresponding to a selection of the at least one first level option is received, and the method further includes presenting a plurality of second level options corresponding to the at least one first level option. The method still further includes receiving a second input corresponding to a selection of one of the second level options. The first options can be presented as switch positions of a manual switch having at least two positions, and the second level options can be presented as text messages on a display panel.

DETAILED DESCRIPTION

The following disclosure describes apparatuses and methods for receiving, displaying and implementing flight guidance information associated with the control of aircraft. Certain specific details are set forth in the following description and in FIGS. 2A-14B to provide a thorough understanding of various embodiments of the invention. Well-known structures, systems and methods often associated with aircraft flight guidance systems have not been shown or described in detail below to avoid unnecessarily obscuring the description of the various embodiments of the invention. In addition, those of ordinary skill in the relevant art will understand that additional embodiments of the present invention may be practiced without several of the details described below.

Many embodiments of the invention described below may take the form of computer-executable instructions, such as routines executed by a programmable computer (e.g., a flight guidance computer). Those skilled in the relevant art will appreciate that the invention can be practiced on other computer system configurations as well. The invention can be embodied in a special-purpose computer or data processor that is specifically programmed, configured or constructed to perform one or more of the computer-executable instructions described below. Accordingly, the term "computer" as generally used herein refers to any data processor and can include Internet appliances, hand-held devices (including palmtop computers, wearable computers, cellular or mobile phones, multi-processor systems, processor-based or programmable consumer electronics, network computers, mini-computers and the like).

The invention can also be practiced in distributed computing environments, where tasks or modules perform by remote processing devices that are linked through a communications network. In a distributed computing environment, program modules or subroutines may be located in both local and remote memory storage devices. Aspects of the invention described below may be stored or distributed on computer-readable media, including magnetic and optically readable and removable computer disks, as well as distributed electronically over networks. Data structures and transmissions of data particular to aspects of the invention are also encompassed within the scope of the invention.

Figure 2A:
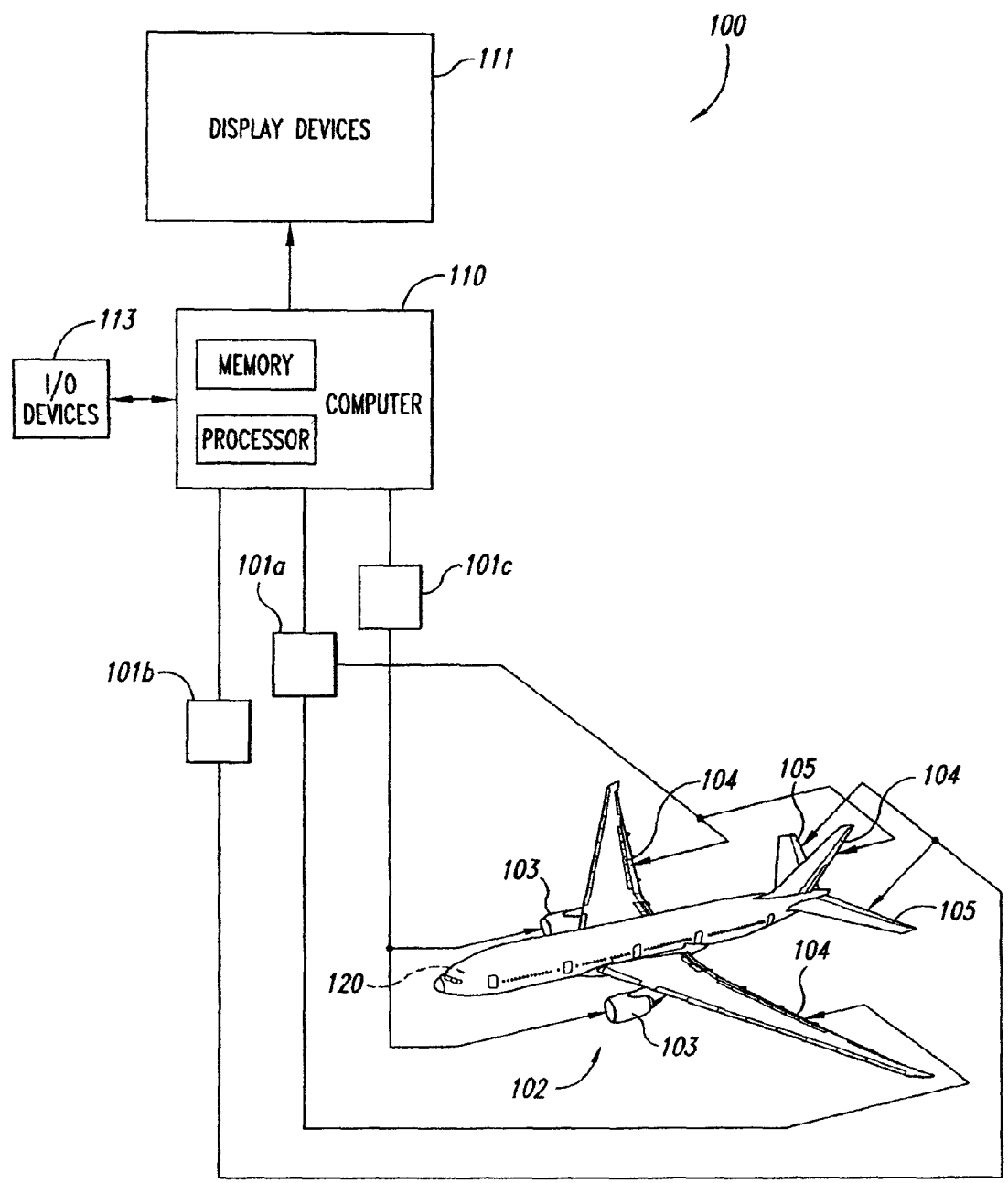
FIG. 2A is a schematic illustration of an aircraft having a flight guidance system in accordance with an embodiment of the invention.

FIG. 2A is a schematic illustration of an aircraft 102 having a flight guidance system 100 configured in accordance with an embodiment of the invention. In one aspect of this embodiment, the flight guidance system 100 can include a flight guidance computer 110 linked to one or more control systems 101, shown in FIG. 2A as a lateral motion or roll control system 101a, a vertical motion or pitch control system 101b, and an airspeed or engine control system/autothrottle 101c. The lateral motion control system 101a can be coupled to lateral control surfaces 104 (e.g., the ailerons and/or rudder of the aircraft 102). The vertical motion controller 101b can be coupled to pitch control surfaces 105 of the aircraft 102 (e.g., the aircraft elevators). The airspeed controller 101c can be coupled to engines 103 of the aircraft 102.

The flight guidance computer 110 can include a memory and a processor, and can be linked to one or more display devices 111, I/O devices 113 and/or other computers of the system 100, as described in greater detail below. The I/O devices 113 can be housed in a flight deck 120 of the aircraft 102, and can be used by the pilot or other operator to provide instructions to the flight guidance system 100. Instructions can also be provided via telemetry from ground-based stations, or via satellite, data link or gate link. Accordingly, the flight guidance computer 110 can include a receiver portion that receives inputs from an operator or another source, a processor portion that processes signals (e.g., input signals) and/or a display portion that displays information (e.g., to the operator).

Figure 2B:
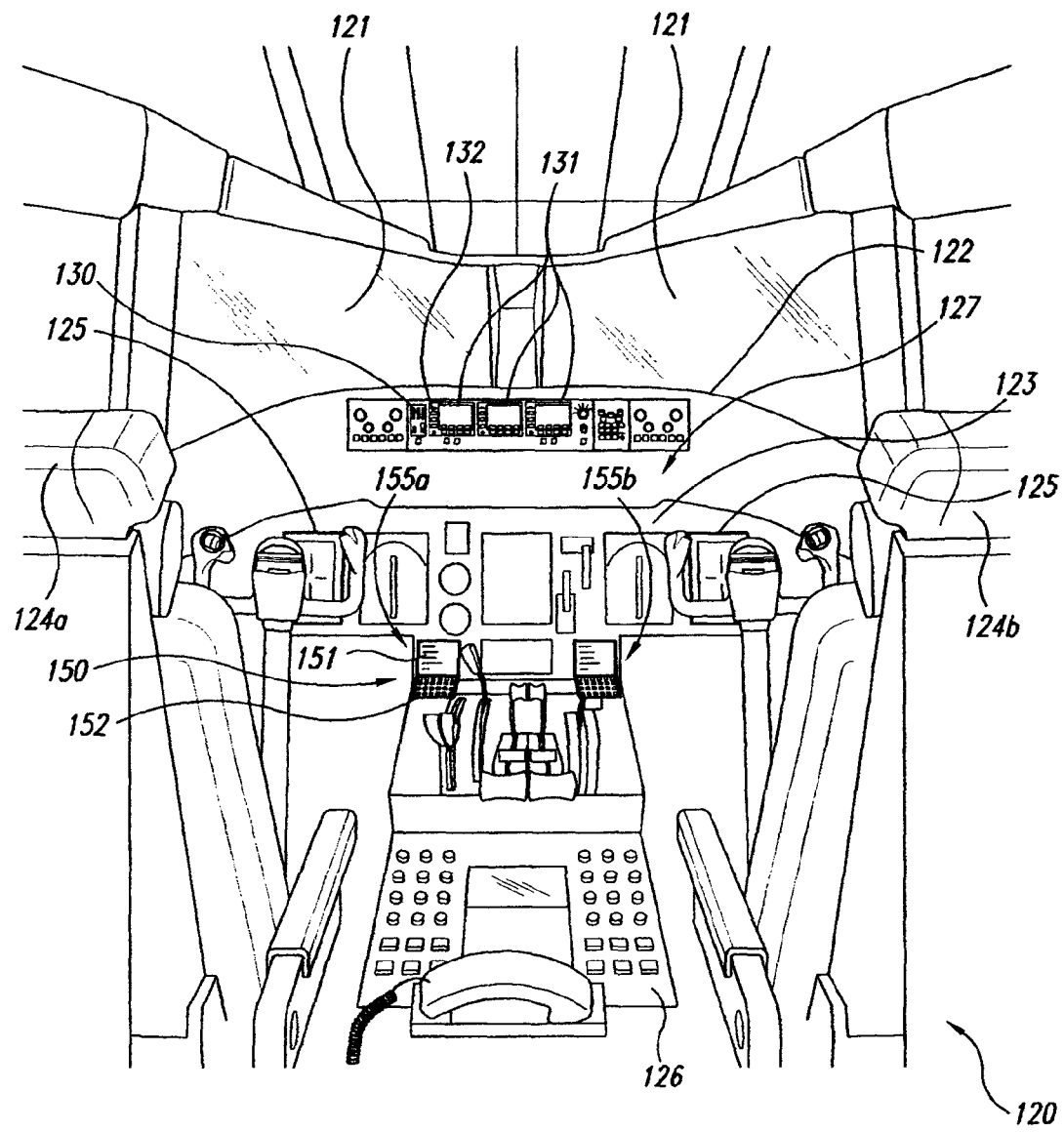
FIG. 2B is a partially schematic illustration of a flight deck having a flight guidance system with displays and controls configured in accordance with an embodiment of the invention.

FIG. 2B is a forward elevational view of an embodiment of the flight deck 120 shown in FIG. 2A. In one aspect of this embodiment, the flight deck 120 includes forward windows 121 providing a forward field of view out of the aircraft 102 (FIG. 2A) for operators seated in a first seat 124a and/or a second seat 124b. In other embodiments, the forward windows 121 can be replaced by one or more external vision screens that include a visual display of a forward field of view out of the aircraft 102. A glare shield 122 can be positioned adjacent to the forward windows 121 to reduce glare on one or more flight instruments 127 positioned on a control pedestal 126 and a forward instrument panel 123.

The flight instruments 127 can include primary flight displays (PFDs) 125 that provide the operators with actual flight parameter information. The flight instruments 127 can further include a mode control panel (MCP) 130 having input devices 132 for receiving inputs from the operators, and a plurality of displays 131 for providing flight control information to the operators. The inputs received from the operators at the mode control panel 130 are primarily tactical inputs, e.g., inputs that are implemented by the control system immediately upon activation by the operators. A flight management computer (FMC) 150 includes control display units (CDUs) 155a, 155b positioned on the control pedestal 126. The CDUs 155a, 155b include a flight plan list display 151 for displaying information corresponding to upcoming segments of the aircraft flight plan. The CDUs 155a, 155b also include input devices 152 (e.g., alphanumeric keys) that allow the operators to enter information corresponding to these segments. The inputs received at the flight management computer 150 are primarily strategic inputs, e.g., inputs that are implemented at a later time, for example, upon achieving a flight plan target or completing a previous flight plan segment.

Figure 3:
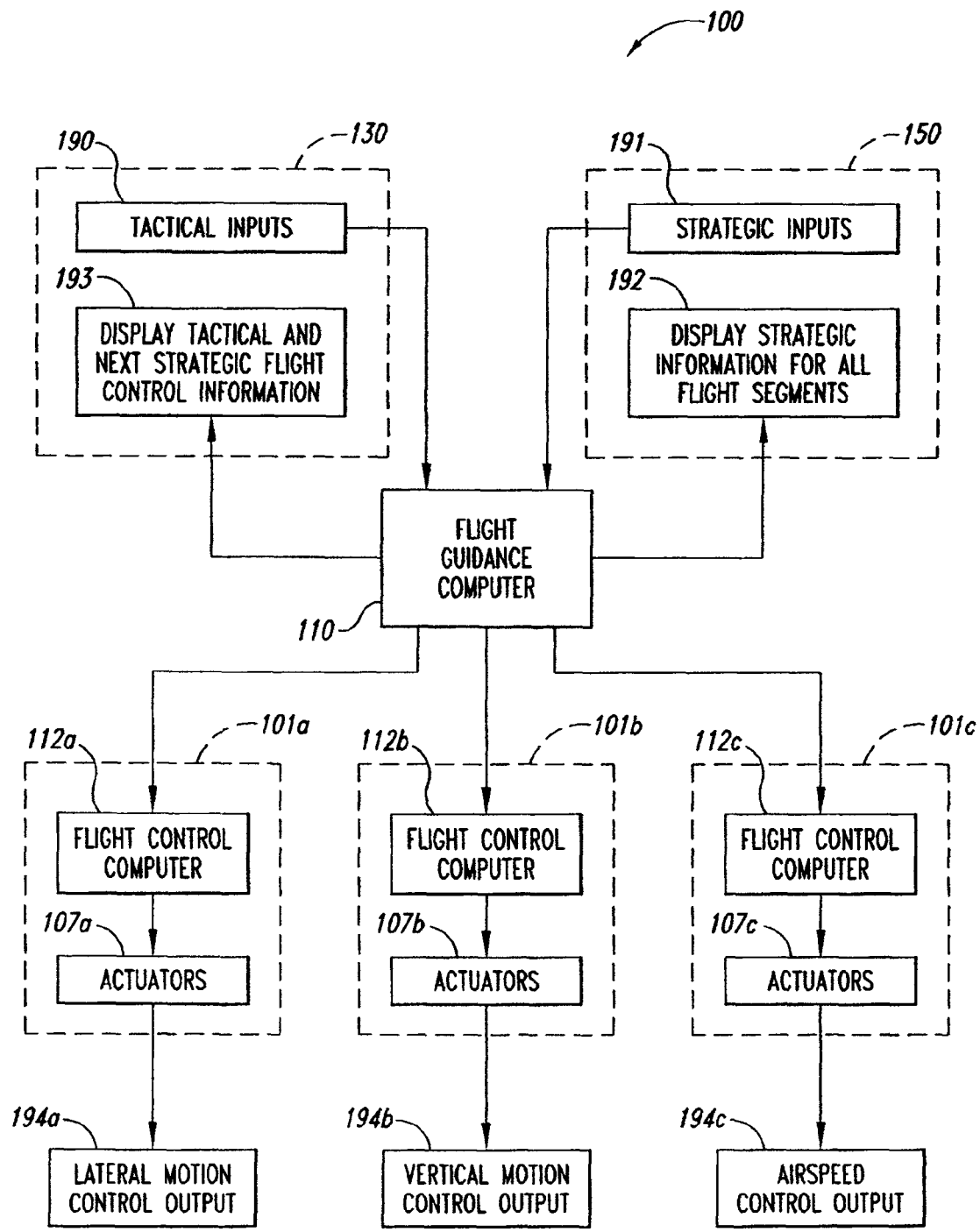
FIG. 3 is a block diagram illustrating in a general manner the operation of a flight guidance system in accordance with an embodiment of the invention.

FIG. 3 is a block diagram illustrating generally how components of the flight guidance system 100 interact with each other, in accordance with an embodiment of the invention. In one aspect of this embodiment, the flight guidance computer 110 can receive tactical inputs 190 provided by the operator via the mode control panel 130 or another input device. The flight guidance computer 110 can also receive strategic inputs 191 from the flight management computer 150, which can in turn receive inputs directly from the operators or from other sources, (e.g., via telemetry) as described above. The flight guidance computer 110 can present current and future strategic information on the flight plan list display 151 (FIG. 2B), as indicated in block 192. The flight guidance computer 110 can also display the current tactical and/or strategic flight information, together with strategic flight control information for the next upcoming segment of the flight (block 193) on the mode control panel 130. In one aspect of this embodiment, the manner in which the information is displayed on the mode control panel 130 and the flight plan list display 151 can be at least approximately identical, as described in greater detail below with reference to FIGS. 14A-14B.

The flight guidance computer 110 is coupled to the control systems 101a-101c, each of which can include a corresponding flight control computer 112 (shown as flight control computers 112a-112c) coupled to one or more corresponding actuators 107 (shown as actuators 107a-107c). The actuators 107a-107c provide aerodynamic and thrust outputs to control the lateral motion, vertical motion, and airspeed of the aircraft, as shown in blocks 194a-194c. Accordingly, the flight guidance computer 110 can (a) receive inputs from a plurality of sources, (b) display information to the operators, and (c) coordinate the delivery of the inputs to the appropriate control devices.

Figure 4:
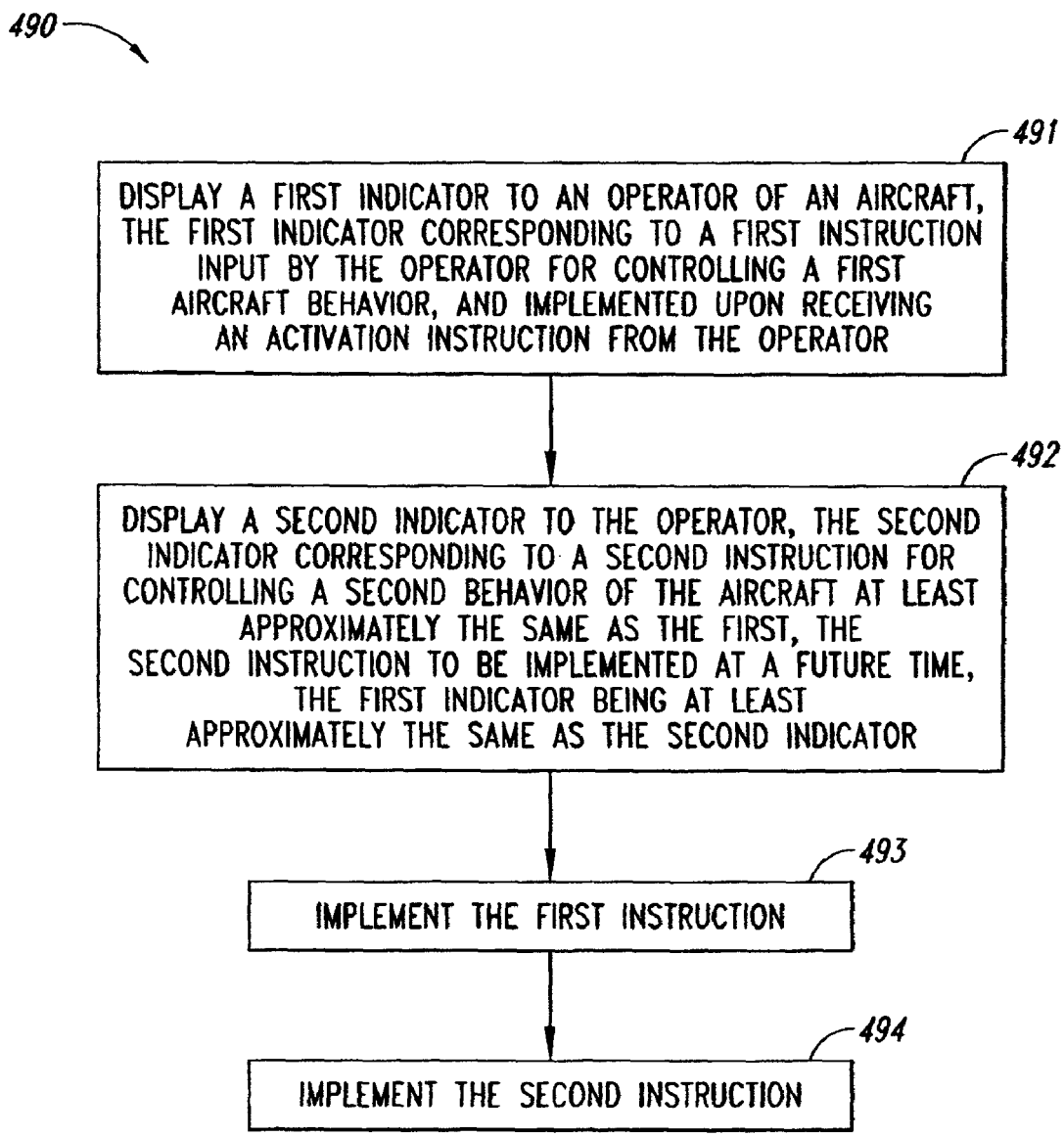
FIG. 4 is a block diagram illustrating a method for displaying indicators for automatically controlling the motion of an aircraft in accordance with an embodiment of the invention.

FIG. 4 is a block diagram illustrating a process 490 for displaying tactical and strategic flight control information in a similar or identical manner. The process 490 includes displaying a first indicator to an operator of an aircraft, with the first indicator corresponding to a first instruction input by the operator for controlling a first aircraft behavior (process portion 491). For example, the first indicator can include alphanumeric symbols representing instructions for controlling the lateral motion, vertical motion and/or airspeed of the aircraft. The first instruction is implemented upon receiving an activation instruction from the operator. For example, the first instruction can be implemented when the operator pushes a switch on the mode control panel 130 (FIG. 3). This type of operation is sometimes referred to herein as "unlinked" operation because the aircraft is responding to tactical instructions that are typically not tied directly to a predetermined flight plan for the aircraft.

In process portion 492, a second indicator is displayed to the operator, with the second indicator corresponding to a second instruction for controlling a second aircraft behavior at least approximately the same as the first. The second instruction is to be implemented at a future time. For example, both the first and second behaviors can correspond to an aircraft climb, descend, turn, or other behavior command. The second instruction can include a strategic input received from the flight management computer 150 (FIG. 2B). The second instruction can correspond to a segment of the aircraft flight plan that has not yet been executed, but that will be executed automatically when the segment currently being flown by the aircraft is completed, or upon achieving another target. This type of operation is sometimes referred to herein as "linked" operation because the aircraft is responding to strategic instructions that form part of a predetermined flight plan.

As shown in block 492, the first indicator is at least approximately the same as the second indicator. Accordingly, when the operator views an indication of the manner in which the aircraft is or will be controlled, that indication is consistent whether the indication is for a tactical instruction input by the operator for immediate (or nearly immediate) implementation, or a strategic instruction to be implemented by the flight guidance system in accordance with a preset flight plan.

In process portion 493, the first instruction is implemented, and in process portion 494, the second instruction is implemented. The instructions can be implemented by passing the instructions from the flight guidance computer 110 (FIG. 3) to the flight control computers 112a-112c (FIG. 3), as described above. In some cases, the instructions provided to control aircraft motion in any axis are independent of the instructions provided to control motion in any other axis. In other cases, the instructions for motion about different axes can be automatically coupled.

In one aspect of the foregoing embodiments, implementing the instructions can include automatically carrying out the instructions, for example, if the operator has engaged the autopilot or autoflight capabilities of the aircraft. In another embodiment, implementing the instructions can include providing a visual guide (e.g., on the PFDs 125 described above with reference of FIG. 2B) that allows the operator to manually fly the aircraft in accordance with the instructions. Such a guide can include a conventional crosshair target for the lateral and vertical motion of the aircraft, and/or a target thrust indicator for aircraft speed.

Figure 1A:
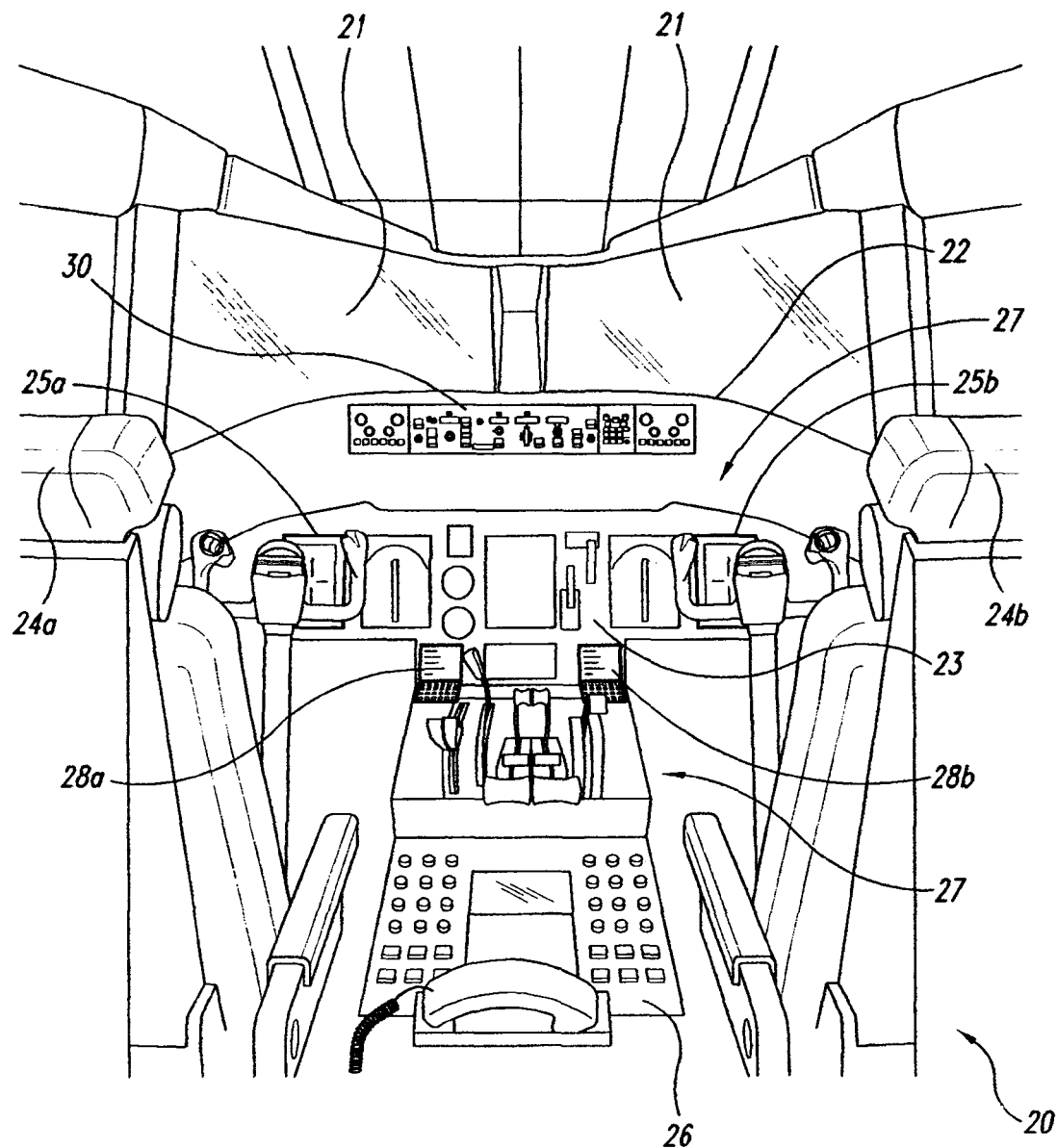
FIG. 1A illustrates a flight deck of an aircraft having a flight management system in accordance with the prior art.
Figure 5:
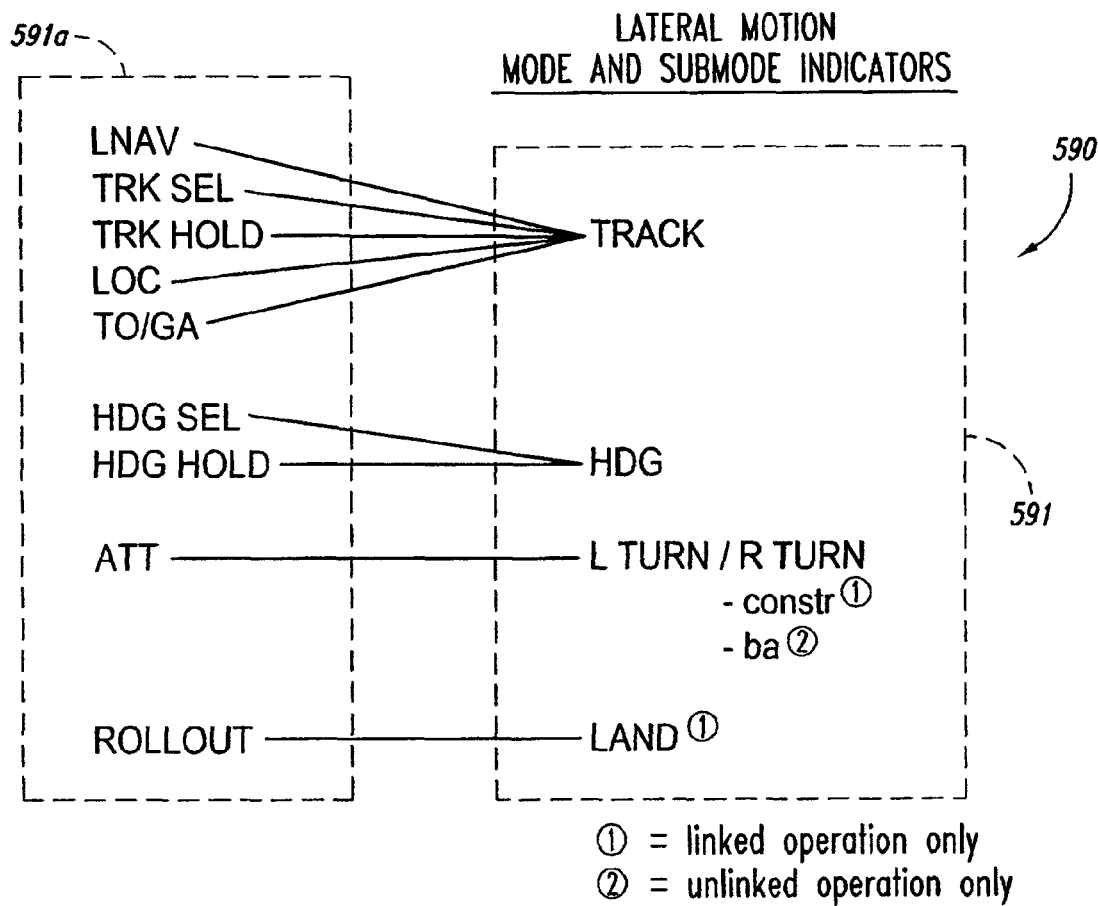
FIG. 5 is an illustration of lateral motion modes in accordance with an embodiment of the invention, along with existing lateral motion modes.

The indicators described above with reference to FIG. 4 can include mode and submode indicators (which identify the type of maneuver the aircraft is or will be performing) and a target indicator (which identifies the target to which the maneuver is directed). FIG. 5 illustrates a chart 590 comparing lateral motion mode and submode indicators 591 (in accordance with an embodiment of the invention) with existing lateral mode indicators 591a (generally similar to those described above with reference to FIG. 1A). Modes are indicated by capital letters and submodes by lower case letters. Certain modes and/or submodes are available only for linked operation or only for unlinked operation (in one embodiment), as indicated by superscripts "1" and "2", respectively.

One feature of the mode and submode indicators 591 is that they are significantly less numerous than the existing mode indicators 591a. Accordingly, the operator can provide instructions and understand information in a simplified manner, reducing the amount of training time required to become proficient. Another feature of the mode and submode indicators 591 is that they are the same (e.g., as displayed to the operator and as selected by the operator), whether the aircraft is operating in a linked manner or an unlinked manner. This arrangement can provide for more consistency between linked and unlinked operations, further reducing the time required for the operator to become proficient in handling automatic aircraft functions.

Another feature of the mode and submode indicators 591 is that they are arranged hierarchically. For example, if the operator wishes to execute a left turn (represented by mode "L TURN") or a right turn (represented by mode "R TURN"), the operator can optionally elect to have the turn constrained (submode "constr") if flying in a linked manner. In a constrained turn, the bank angle is modulated in accordance with strategic targets to achieve "DME" arcs, curved noise abatement departures, complex curved approaches and other preselected maneuvers. When the aircraft is operating in an unlinked manner, the operator can optionally elect to have the turn bank angle limited to a value input by the operator (submode "ba"). This hierarchical organization allows the operator to first select the overall type of maneuver or behavior to be executed, and then select the details. Such an arrangement can be more intuitive for the operator than existing modes, and can accordingly further reduce training time.

Still another feature of the mode and submode indicators 591 is that they can have simple, specific and mnemonically consistent meanings. For example, the "L TURN" and "R TURN" modes describe, simply and mnemonically, left turns and right turns, respectively. The "TRACK" mode includes straight flight tracks (e.g., great circle lines), including capturing and maintaining straight flight tracks. The "HDG" mode maintains a selected heading. Under the "HDG" mode, the path of the aircraft does not account for the effects of wind, while under the "TRACK" mode, wind direction is accounted for.

The "LAND" mode (available only during linked operation, in one embodiment) automatically controls a de-crab maneuver just prior to touchdown, and controls runway centerline tracking after landing. The "LAND" mode (and other modes included in the flight plan for actions prior to and subsequent to actual landing) have associated with them sufficient runway information to allow the aircraft to automatically land on a selected runway and conduct pre-landing lead-in and/or post-landing follow-up operations. These modes also have associated with them instructions for an aircraft go-around in the case of a missed approach. One feature of this arrangement is that the "LAND" mode and other modes can be a part of the preset flight plan loaded into the flight management computer 150. This is unlike existing auto land features which must be input by the operator at the mode control panel. An advantage of this arrangement is that it can reduce the pilot workload during flight because it can be established prior to flight as part of the flight plan. Another advantage is that the go-around feature can be automatically implemented when the operator activates a go-around switch in the flight deck. If necessary, the flight plan information can be updated during flight, for example, if the aircraft is redirected to an alternate landing site.

Figure 1B:
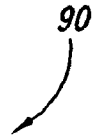
FIG. 1B illustrates existing flight mode annunciators in accordance with the prior art.
Figure 6:
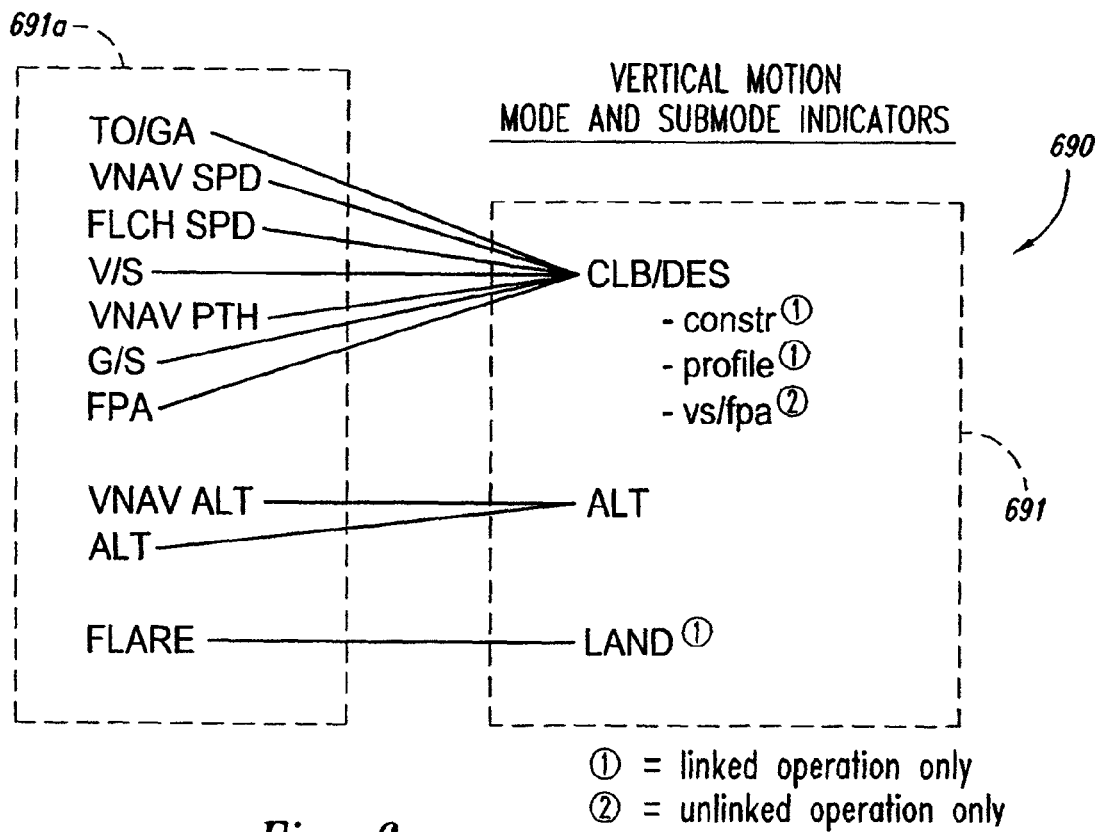
FIG. 6 is an illustration of vertical motion modes in accordance with an embodiment of the invention, along with existing vertical motion modes.

FIG. 6 illustrates a chart 690 comparing vertical motion mode and submode indicators 691 with existing mode indicators 691a generally similar to those described above with reference to FIG. 1B. The vertical motion mode and submode indicators 691 can be (a) fewer in number than the existing mode indicators 691a, (b) nested in a hierarchical fashion, and (c) consistent for both linked and unlinked operation, in a manner generally similar to that described above with reference to FIG. 5. In particular, modes "CLB" and "DES" control climb and descent, respectively, of the aircraft. Without selecting a submode, these modes can be used for takeoff climb, go-around, terrain avoidance, wind shear escape, normal climb, unconstrained cruise descents, and emergency descents. If the aircraft is flying in a linked manner, the "constr" submode, which can be used for any climb or descent where thrust is modulated to meet a specific way point target is available via the FMC. Alternatively, the "profile" submode for final approach, tunnel climbs and descents, or drift up (e.g., continuous optimal altitude cruise climb) is available. During unlinked operation, the pilot can select the "vs" or "fpa" submodes to climb or descend with a specific vertical speed or flight path angle, respectively.

The "ALT" mode controls all level flight, including capturing and maintaining a particular altitude. The "LAND" mode, available only for unlinked operation in one embodiment, includes flare, touchdown and de-rotation after touchdown.

Figure 7:
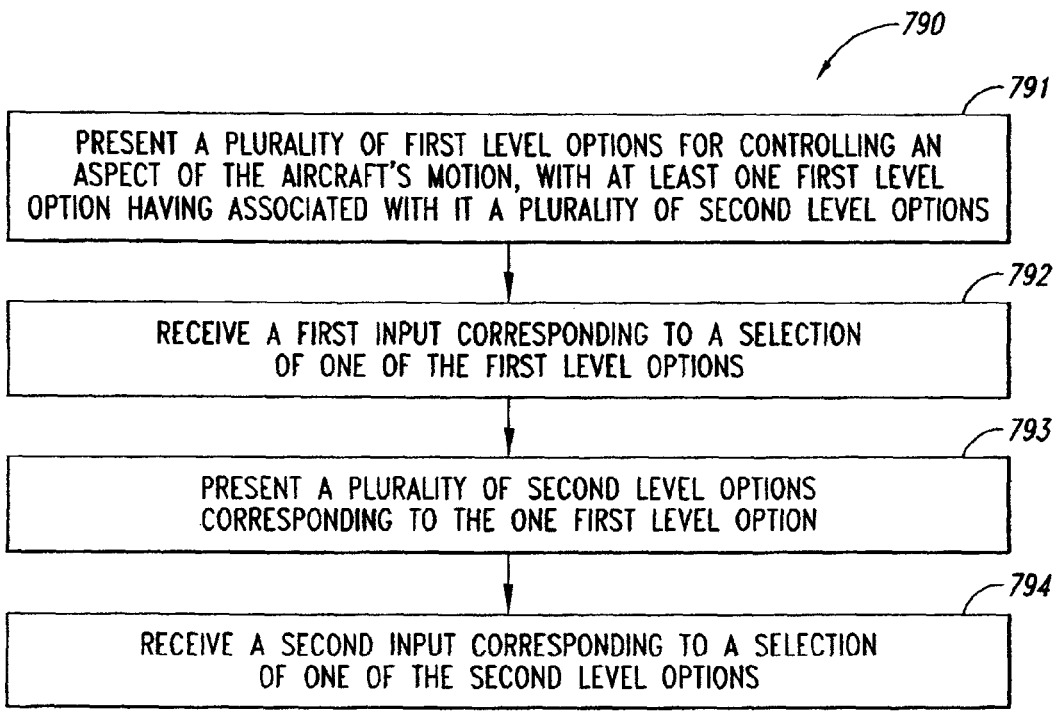
FIG. 7 is a flow diagram illustrating a method for presenting control information and receiving control inputs at two different hierarchical levels in accordance with an embodiment of the invention.

As described above, the modes and submodes can be arranged hierarchically to provide a simpler, more intuitive manner for displaying and receiving flight control information. FIG. 7 is a flow diagram illustrating a process 790 for presenting to an operator hierarchically organized options for controlling the flight of an aircraft, in accordance with an embodiment of the invention. Process portion 791 includes presenting a plurality of first level options (e.g., mode indicators) for controlling an aspect of the aircraft's motion. At least one first level option has associated with it a plurality of second level options (e.g., submodes). The first level options can be displayed in a menu-type format, or by settings on one or more switches, or by other arrangements.

In any of these arrangements, the operator can select from among the first level options. Accordingly, the process 790 further includes receiving a first input corresponding to a selection of one of the first level options (process portion 792). Once the first input has been received, the process 790 can further include presenting a plurality of second level options (e.g., submode indicators) corresponding to the one first level option selected in process portion 792 (process portion 793). In one aspect of this embodiment, the second level options for each first level option can be unique. In other embodiments, at least some of the second level options can be shared among first level options. In any of these embodiments, in process portion 794, a second input corresponding to a selection of one of the second level options is received. The selected first and second level options can then be activated to control an aspect of the aircraft's motion.

One advantage of the foregoing hierarchical structure is that it can be easier to understand. Accordingly, it may require less time and expense to train operators in its use. Another advantage is that such a structure lends itself to future upgrades. For example, if new submodes are developed at a later date, they can be added to the system with relative ease and without disrupting the organization of the first level modes. A further advantage is that the hierarchical structure of the mode options can be implemented on a mode control panel 130 without requiring changes to existing PFDs 125 (FIG. 2B) or head up displays. Accordingly, the mode control panel 130 and associated modes and submodes can more easily be retrofitted on existing flight decks. A mode control panel 130 configured to present the foregoing modes and receive corresponding inputs is described in greater detail below with reference to FIG. 8.

Figure 8:
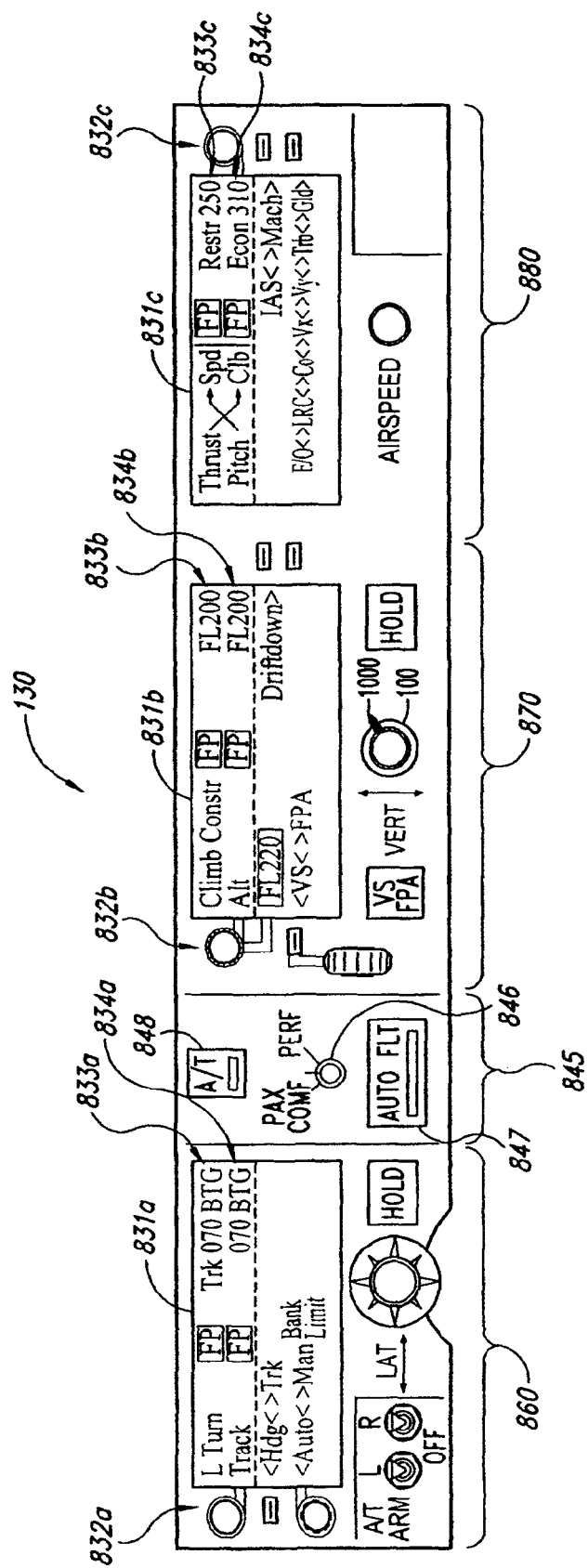
FIG. 8 is a front elevation view of a mode control panel having displays and controls arranged in accordance with an embodiment of the invention.

FIG. 8 is a partially schematic illustration of a mode control panel 130 configured in accordance with an embodiment of the invention. The mode control panel 130 can include a lateral motion portion 860, a vertical motion portion 870, an airspeed portion 880, and a general control portion 845. The general control portion 845 can include a performance selector 846 which can be manipulated by the pilot to determine how aggressively the aircraft carries out control inputs. In a particular aspect of this embodiment, each setting of the performance selector 846 establishes performance behavior that is the same or approximately the same for lateral motion, vertical motion and airspeed. An autothrottle switch 848 is used by the pilot to engage the autothrottles, and an autoflight switch 847 is used by the operator to engage the autopilot and autothrottle capabilities of the system 100.

Each of the remaining portions 860, 870 and 880 can include displays 831 (shown as a lateral motion display 831a, a vertical motion display 831b, and an airspeed display 831c), and input devices 832 (shown as lateral motion input devices 832a, vertical motion input devices 832b, and airspeed input devices 832c). Each display 831 can include current control indicators 833 (shown as lateral, vertical and airspeed current control indicators 833a, 833b and 833c, respectively) and next control indicators 834 (shown as next lateral, vertical and airspeed control indicators 834a, 834b and 834c, respectively). The current control indicators 833 pertain to the maneuver currently being executed by the aircraft, and the next control indicators pertain to the next maneuver to be executed by the aircraft. In a particular aspect of this embodiment, the manner in which the next indicators are displayed can indicate which aspect of the upcoming maneuver will be executed first. For example, if the next lateral control indicator 834a identifies an upcoming change in heading, and the next vertical control indicator 834b identifies an upcoming change in altitude to be implemented after the change in heading, the next lateral control indicator 834a can appear in a different font or color to indicate that the change in heading will be executed before the change in altitude. If these changes will be executed at the same time, they can be displayed in the same manner. Further details of the current control indicators 833 and next control indicators 834 are provided below with reference to FIGS. 9A-11B.

Figure 9A:
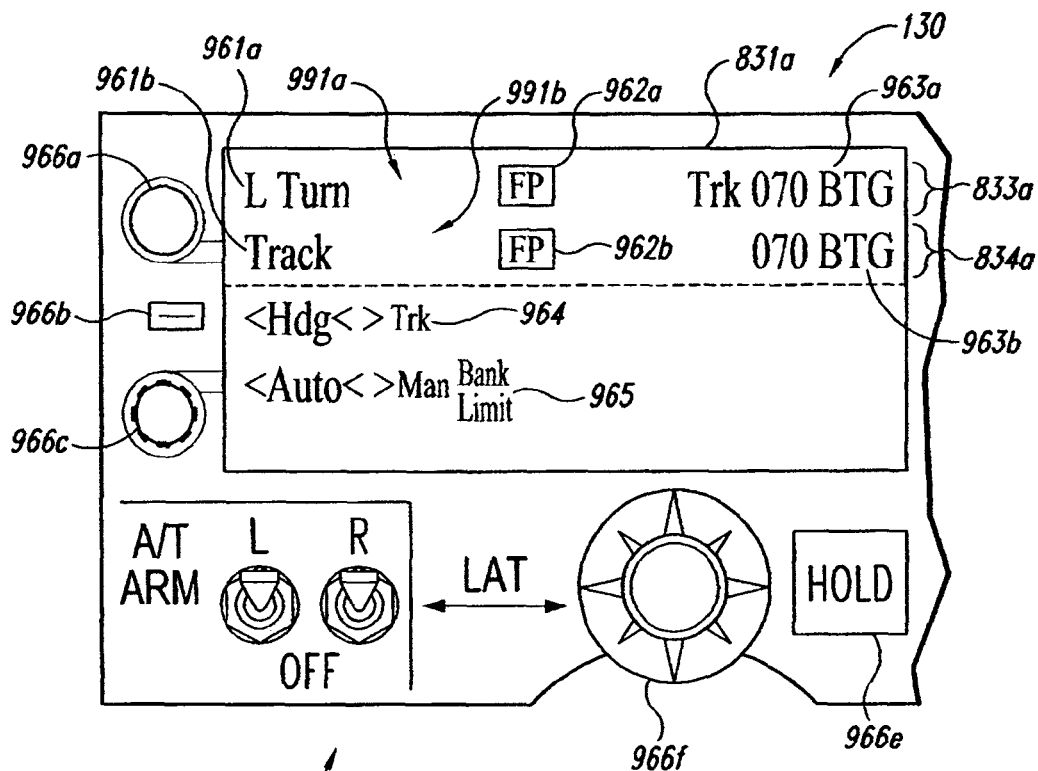
FIGS. 9A-9B illustrate a portion of the mode control panel shown in FIG. 8 for controlling lateral motion of an aircraft in accordance with an embodiment of the invention.

FIG. 9A illustrates the lateral motion portion 860 of the mode control panel 130 described above with reference to FIG. 8 as it appears during linked operation in accordance with an embodiment of the invention. The current lateral control indicators 833a are arranged on one line, and the next lateral control indicators 834a are arranged below. The current lateral control indicators 833a include a current lateral mode indicator 961a, a current lateral submode indicator 991a (shown blank in FIG. 9A), a current lateral link indicator 962a and a current lateral target indicator 963a. The next lateral control indicators 834a include a next lateral mode indicator 961b, a next lateral submode indicator 991b (also blank), a next lateral link indicator 962b, and a next lateral target indicator 963b.

The lateral current mode and submode indicators 961a, 991a indicate the lateral mode under which the aircraft is currently operating, and the current lateral target 963a indicates the lateral target to which the aircraft is being directed. The current lateral link indicator 962a indicates that lateral control of the aircraft is linked to the flight plan via the flight management computer 150 (FIG. 2B). The next lateral mode indicator 961b and submode indicator 991b indicate the lateral mode and submode under which the aircraft will operate upon attaining the current lateral target 963a. At that point, the aircraft will be controlled to the next lateral target 963b. The next lateral link indicator 962b indicates that this operation will also be linked to the flight plan. The operator can link the operation of the aircraft to the flight plan by pressing a link switch 966a, which, if the aircraft is not already operating in a linked manner, will cause the aircraft to fly to the next available segment programmed into the flight management computer 150.

During linked operation, the modes, submodes and targets displayed in the lateral motion display 831a are obtained directly from the flight management computer 150. During unlinked operation, the modes and submodes can be selected by the operator when the operator actuates switches at the mode control panel 130. For example, the operator can toggle between the "HDG" or "TRK" modes by toggling a lateral maintain selector switch 966b. The selected and available modes appear in an adjacent lateral maintain display 964 with the selected mode highlighted (e.g., by appearing in a larger font) as shown in FIG. 9A. The color of the mode (or submode) indicator can identify to the operator (a) whether the mode (or submode) is available to be selected, and/or (b) whether operation of the mode (or submode) is linked or unlinked. The operator can select a bank angle submode using a bank limit selector switch 966c. The selected and available bank limit submodes appear in a bank limit display 965. The operator can actuate a lateral selector 966f to indicate the direction and target for left and right turns, and can activate a lateral hold switch 966e to roll the aircraft out of a current turn. If the aircraft is in linked operation, pushing the lateral selector 966f or lateral hold switch 966e will automatically unlink the lateral motion of the aircraft from the flight management computer 150.

In one aspect of the foregoing arrangement, the current lateral target 963a can be automatically updated when the operator activates the lateral hold switch 966e. For example, the current lateral target 963a can be updated immediately (or nearly immediately) after the lateral hold switch 966e has been activated to provide an estimate of the new lateral target to which the aircraft will be directed upon completion of the rollout maneuver. In another aspect of this embodiment, which can be implemented in addition to or in lieu of the foregoing aspect, the current lateral target 963a can be updated once the rollout maneuver has been completed to indicate the actual new target to which the aircraft is being directed.

Figure 9B:
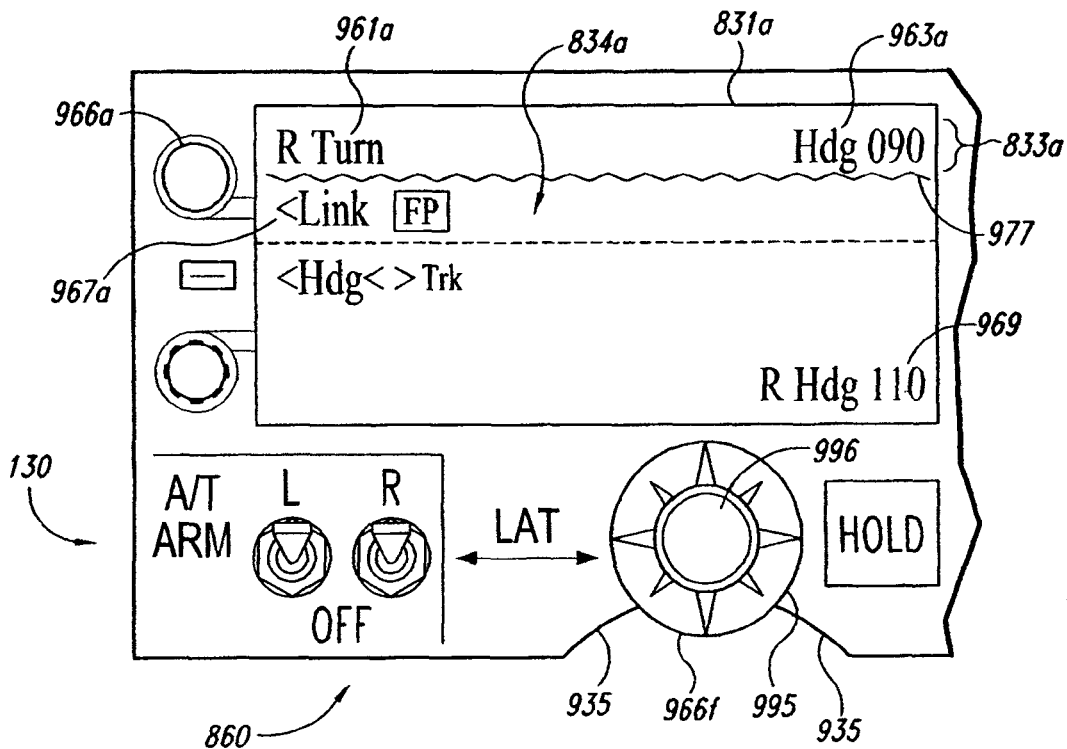

FIG. 9B illustrates the lateral motion display 831a during unlinked operation, in accordance with an embodiment of the invention. An unlink indicator 977 highlights to the operator that the current operation is unlinked, and the current lateral control indicators 833a indicate the current lateral mode 961a and current lateral target 963a. A link prompt 967a indicates that the pilot can link to the flight plan by pressing the link switch 966a. In one embodiment, if the distance to the flight plan route is less than 2.5 nautical miles, the aircraft will fly in mode "L TURN," "R TURN," "HDG" or "TRK" to get to the flight plan route. If the distance is greater than 2.5 miles, the flight guidance computer 110 (FIG. 3) creates a new leg and intercept way point and automatically links the leg with the route.

In another embodiment, the lateral motion display 831a can also include next lateral control indicators 834a (shown blank in FIG. 9B) identifying the next available segment in the flight plan. Accordingly, the operator can easily see which instruction will be implemented if he or she chooses to convert from unlinked operation to linked operation by pressing the link switch 966a.

During unlinked operation, the operator can set up a right or left turn by rotating the lateral selector 966f to the right or left, respectively. As the operator rotates the lateral selector 966f, a preview display 969 indicates the sense of the turn (e.g., left or right), the target to which the turn will be directed, and whether upon completion of the turn the aircraft will be in "HDG" mode or "TRK" mode. In a particular aspect of this embodiment, the sense of the turn will remain the same as long as the operator keeps rotating the lateral selector 966f in the same direction, even if the operator rotates beyond a value that is 180° from the current target. That is, if the operator inputs a 270° left turn by rotating the lateral selector 966f to the left, the aircraft will (upon activation of the instruction) turn 270° to the left, not 90° to the right. This arrangement can accordingly be more intuitive for the operator than some existing systems for which the sense of the turn can depend on the extent of the turn. The pilot can pull the lateral selector 966f to blank the lateral preview display 969, and can push the lateral selector 966f to (a) unlink the lateral motion of the aircraft, if it is not already unlinked, (b) activate the instruction in the lateral preview window 969 (causing this information to appear at the current control indicator display 833a), and (c) blank the lateral preview display 969.

The lateral selector 966f can be configured to be easily accessible and identifiable to the operator. For example, the lateral selector 966f can include a flange 995 having a compass-like rosette, which signifies the lateral aspect of the motion it controls and distinguishes it from other switches on the mode control panel 130. The flange 995 can project below a lower edge 935 of the mode control panel 130, allowing the operator to easily rotate the lateral selector 966f by engaging the flange with a single finger. Alternatively, the operator can rotate the lateral selector 966f by grasping an outwardly extending knob 996.

Figure 10A:
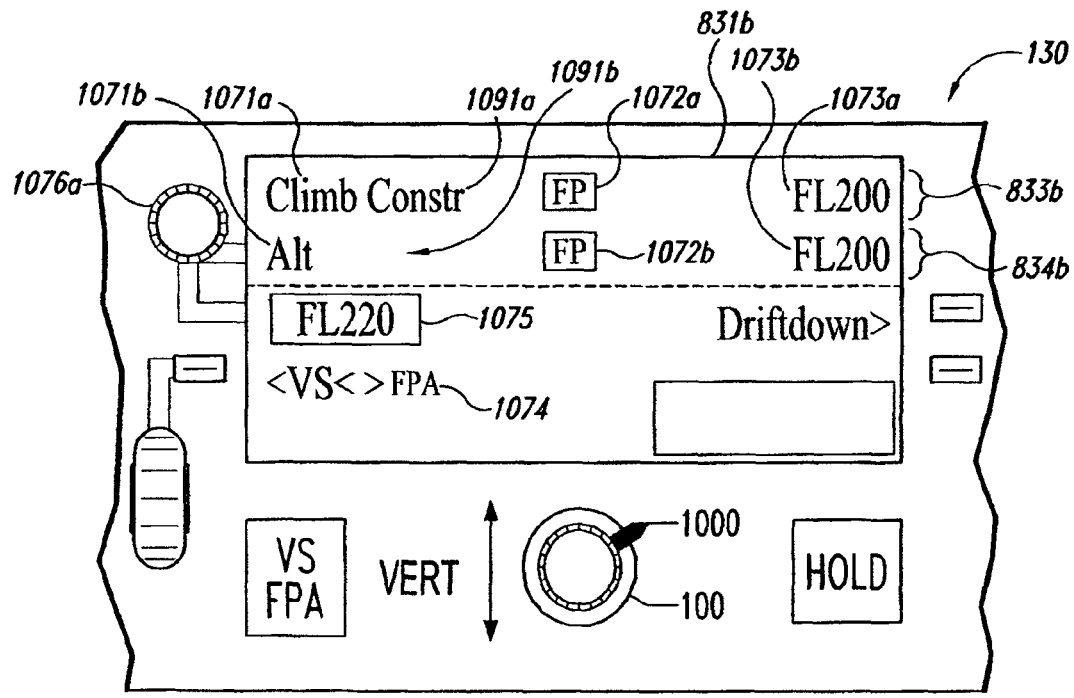
FIGS. 10A-10B illustrate a portion of the mode control panel shown in FIG. 8 for controlling vertical motion of an aircraft in accordance with an embodiment of the invention.

FIG. 10A illustrates the vertical motion portion 870 of the mode control panel 130 during linked operation in accordance with an embodiment of the invention. The overall layout of the vertical motion display 831b and the operation of its input devices are generally similar to those described above with reference to the lateral motion portion 860. Accordingly, the vertical motion display 831b can include a current vertical control indicator 833b and a next vertical control indicator 834b positioned just below. The current vertical control indicator 833b can include a current vertical mode indicator 1071a, a current vertical submode indicator 1091a, a current vertical link indicator 1072a, and a current vertical target 1073a. The next vertical control indicator 834b can include a next vertical mode indicator 1071b, a next vertical submode indicator 1091b (blank in FIG. 10A), a next vertical link indicator 1072b, and a next vertical target 1073b.

If the vertical motion of the aircraft is not already linked to the flight management computer, the operator can create the link by pressing the link switch 1076a. The operator can also rotate the link switch 1076a to select a new target altitude, which appears in a limit altitude display 1075. The limit altitude is inserted into the flight plan. Pulling the link switch 1076a blanks the limit altitude display 1075. Further details of this feature are described below with reference to FIGS. 14A-14B.

Figure 10B:
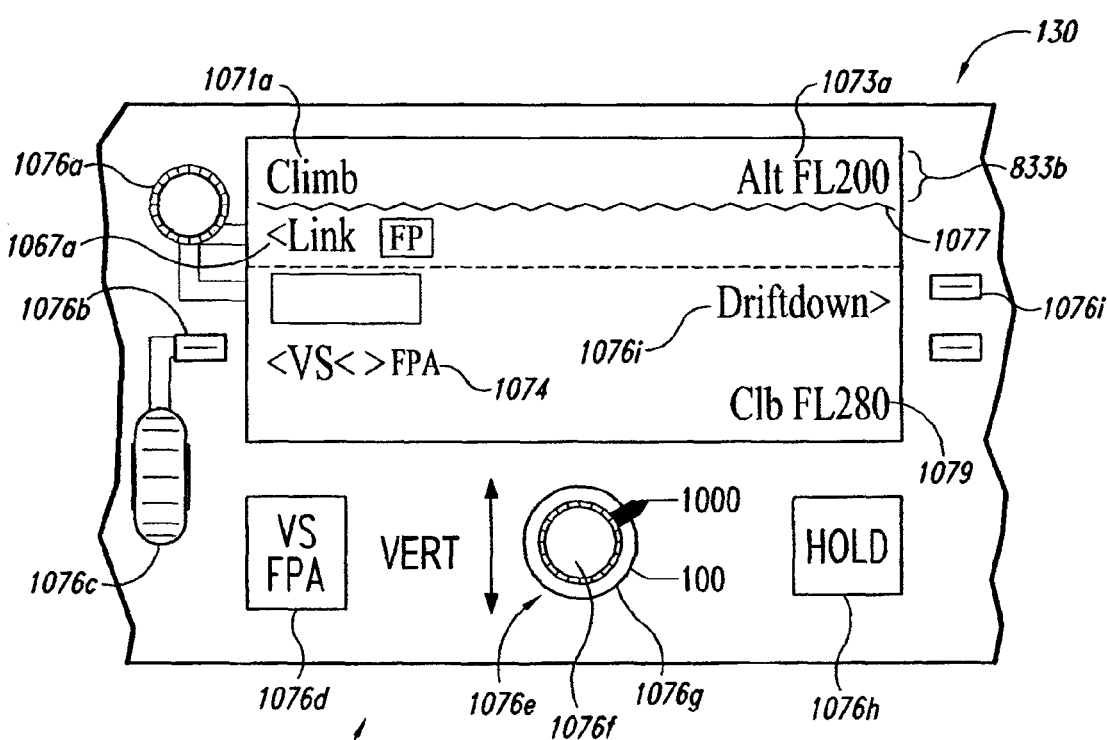

FIG. 10B illustrates the vertical motion portion 870 of the mode control panel 130 during unlinked operation. During unlinked operation, an unlink indicator 1077 appears below the current vertical control indicator 833b, and a link prompt 1067a appears adjacent to the link switch 1076a. The operator can select modes and submodes using the switches at the vertical motion portion 870 of the mode panel 130, in a manner generally similar to that described above with reference to the lateral motion portion 860. For example, the operator can toggle between controlling the aircraft's vertical motion by vertical speed or flight path angle by toggling a vertical maintain selector switch 1076b and changing a corresponding display in a vertical maintain display 1074. The operator can set the value of the vertical speed or flight path angle by rotating a rotary switch 1076c. The operator can engage the "vs" or "fpa" submodes by pressing an engage switch 1076d.

The operator can control the altitude target to which the aircraft will be directed with a vertical selector 1076e. The operator can rotate an altitude selector 1076f and can adjust an increment selector 1076g to control whether the value generated by the altitude selector 1076f is in thousands of feet or hundreds of feet. As the operator adjusts the vertical selector 1076e, the mode and target are updated in a vertical preview display 1079. When the operator pushes the vertical selector 1076e, the vertical motion axis of the aircraft is unlinked (if it is not already unlinked), the information in the vertical preview display 1079 is presented in the current vertical indicator 833b, and the vertical preview display 879 is blanked. Pressing a vertical hold switch 1076h will cause the aircraft to level out and maintain the resulting altitude. The current vertical target 1073a can be updated to provide an estimated and/or actual level out altitude, in a manner generally similar to that described above with reference to the current lateral target 963a shown in FIGS. 9A-9B. If the operator presses a drift down switch 1076i, the aircraft will fly as gradual a descent as possible, for example, during engine-out operation. In a particular aspect of this embodiment, the gradual descent can be automatically implemented based solely upon the input received when the operator presses the drift down switch 1076i. This is unlike some existing systems which require the operator to change the corresponding cruise altitude and activate an engine-out mode of the flight management computer 150 (FIG. 3) before actually implementing the drift down procedure. Accordingly, the foregoing, simplified arrangement can reduce pilot workload, errors and/or training time and can allow the drift down feature to be more quickly activated.

Figure 11A:
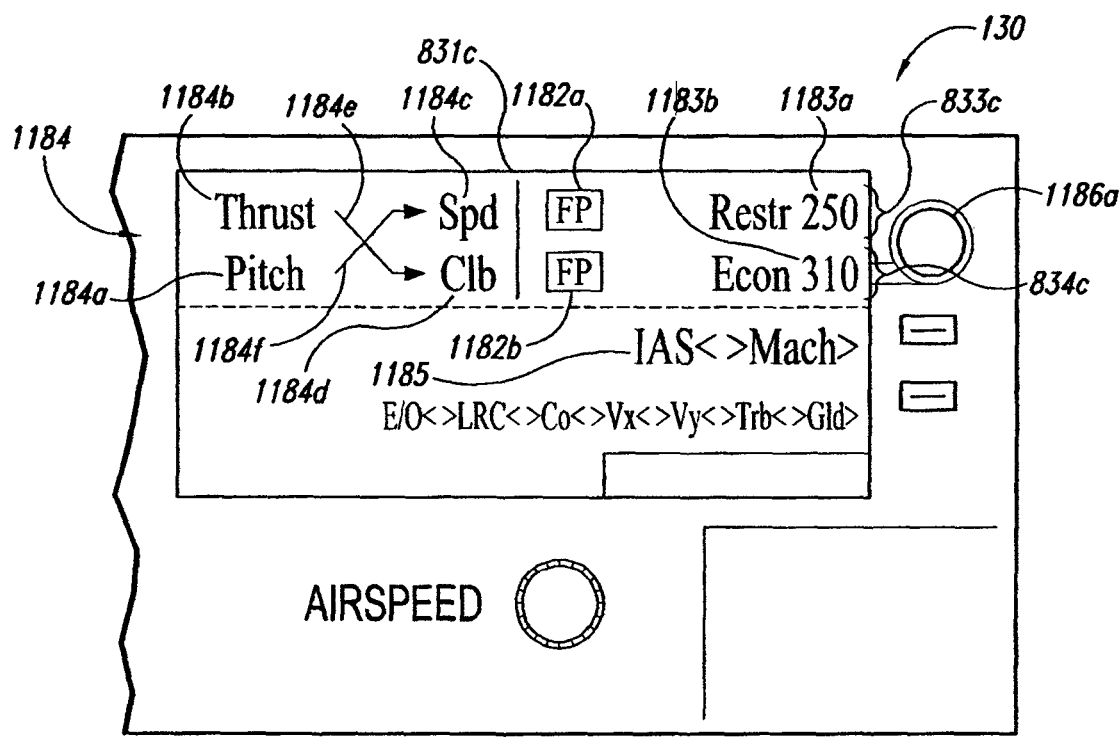
FIGS. 11A-11B illustrate a portion of the mode control panel shown in FIG. 8 for controlling the airspeed of an aircraft in accordance with an embodiment of the invention.

FIG. 11A illustrates the airspeed portion 880 of the mode control panel 130, displaying flight control information during linked operation, in accordance with an embodiment of the invention. Several aspects of the airspeed portion 880 are generally similar to the lateral motion portion 860 and the vertical motion portion 870 described above. For example, the airspeed display 831b can include a current airspeed indicator 833c and a next airspeed indicator 834c positioned below. The operator can push an airspeed link switch 1186a to link the commanded airspeed target (e.g., via the aircraft engines and/or elevators) to the flight plan, as reflected by the current link indicator 1182a and next link indicator 1182b.

In a particular aspect of this embodiment, the automatic control of the aircraft's airspeed is not characterized by modes, but rather by targets along with information indicating the basis for the targets. For example, the current airspeed control indicator 833c can include a current target 1183a and the next airspeed indicator 834c can include a next target 1183b. Each of the targets 1183a, 1183b can include a numerical value of the airspeed to which the aircraft is being controlled and a textual indicator of the basis for the airspeed. For example, "Restr" can indicate a flight plan speed restriction, "Econ" can indicate an economy airspeed setting, "Flap Lim" can indicate a limit speed corresponding to a currently extended flap position, and "Flap Ref" can indicate a maneuvering speed corresponding to a currently extended flap position.

The airspeed display 831c can also include an energy management display 1184, which indicates the manner in which the longitudinal motion and vertical motion of the aircraft are controlled, which in turn depends upon the mode selected for the vertical motion of the aircraft. In one aspect of this embodiment, the energy management display 1184 can include a first indicator 1184*a* for a first aircraft control force in a first direction (e.g., "Pitch") and a second indicator 1184*b* for a second aircraft control force in a second direction (e.g., "Thrust" or "Drag"). The energy management display 1184 also includes a longitudinal target 1184*c* (e.g., "Spd" for speed) and a vertical target 1184*d* (e.g., "Clb" for climb, "Des" for descent, or "Alt" for fixed altitude). A first (pitch) control link 1184*f* (e.g., a line with an arrowhead) indicates whether the pitch attitude of the aircraft is being used to control to a longitudinal target or a vertical target. A second (thrust/drag) control link 1184*e* indicates whether the thrust devices (e.g., engines) or drag devices (e.g., speedbrakes) are being used to control the aircraft to a longitudinal target or a vertical target. For example, when the aircraft is climbing, the first (pitch) control link 1184*f* indicates that the pitch of the aircraft is being adjusted to maintain a target airspeed. The second (thrust/drag) control link 1184*e* indicates that the thrust of the aircraft is being controlled to maintain a target climb rate. The positions of the control links 1184*f* and 1184*e* can be changed depending upon the manner in which these parameters are controlled, as described below with reference to FIG. 11B.

Figure 11B:
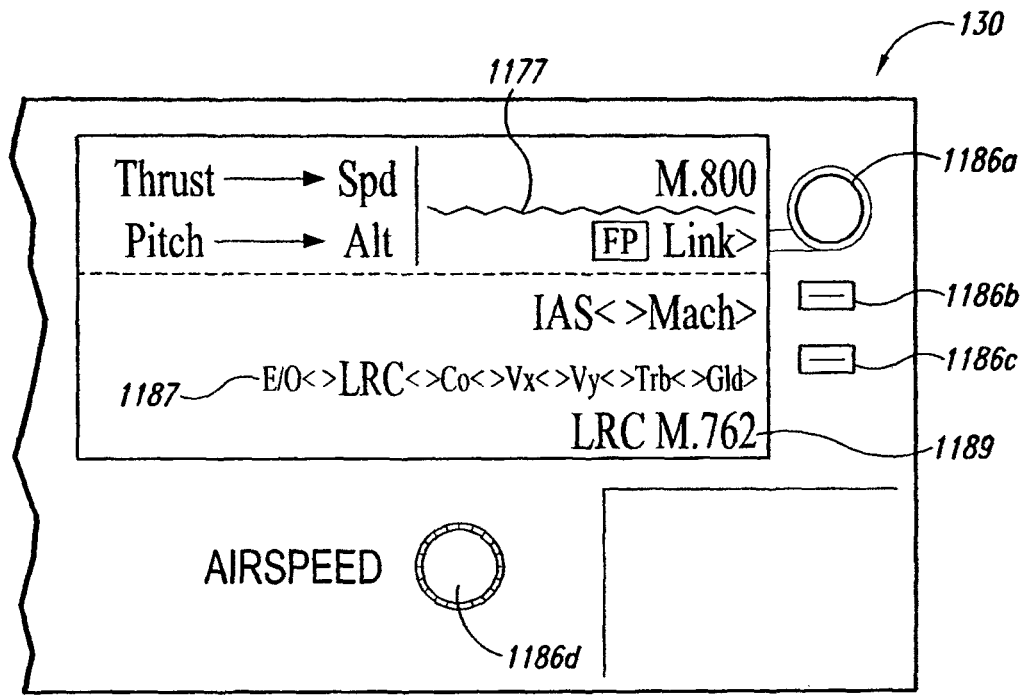

FIG. 11B illustrates the airspeed control portion 880 during unlinked operation in accordance with an embodiment of the invention. In one aspect of this embodiment, an unlink indicator 1177 highlights the fact that the aircraft is operating in an unlinked manner. During unlinked operation, the operator can select a target airspeed by adjusting an airspeed knob 1186*d*, and can determine whether the airspeed is identified by Mach number or indicated airspeed (IAS) by manipulating a toggle switch 1186*b*. The operator can also select among a variety of airspeeds (with associated text modifiers) by pressing an airspeed options key 1186*c*. By repeatedly pressing the airspeed options key 1186*c*, the operator can scroll through a list of airspeed options, each of which corresponds automatically to a particular airspeed. These options can include "E/O" (engine out), "LRC" (long range cruise), "Co" (company specified speed), "Vx" (best flight path angle), "Vy" (best rate of climb), "Trb" (turbulent air penetration), and "Gld" (best glide speed). The value selected by manipulating the airspeed options key 1186*c* or the airspeed selector 1186*d* can appear in an airspeed preview display 1189. Pushing the airspeed selector 1186*d* activates the instruction in the airspeed preview display 1189 and updates the current airspeed control indicator 833*c* accordingly.

In one aspect of the foregoing embodiments, some or all of the indicators can be textual indicators, graphical indicators or a combination of textual and graphical indicators. The links 1184*e*, 1184*f* can change color or another characteristic when it is possible for the operator to change which target 1184*c*, 1184*d* is coupled to the first and second indicators 1184*a*, 1184*b*. In other embodiments, other indicators can also be displayed in different manners depending on whether or not the corresponding control option is available to the operator. For example, in one further embodiment, modes and/or submodes can be displayed in one manner if they are consistent with the selected target, and in another manner if they are inconsistent with the selected target. In a further aspect of this embodiment, the modes and/or submodes that are inconsistent with the selected target may be unavailable for selection by the operator. For example, if the operator chooses a target located above the aircraft's current altitude, the "DES" mode will appear differently to the operator and/or will be unavailable for selection by the operator.

One feature of an embodiment of the mode control panel 130 described above with reference to FIGS. 8-11B is that the arrangement and operation of many of the controls and displays are consistent across at least two of the motion axes. For example, if the operator wishes to link operation of any of the motion axes (which can be done independently of linking the remaining axes), the operator presses a switch located toward the top of the mode control panel 130. If the operator wishes to unlink operation of any of the axes (which can be done independently of unlinking the remaining axes), the operator presses a switch located toward the bottom of the mode control panel 130. The target to which the aircraft is currently being directed is consistently positioned above the target to which the aircraft will subsequently be directed. For motion axes having modes and submodes, the modes are consistently positioned to the left of the target and to the left of the link indicator. Each axis can include a preview display indicating the parameters to which the aircraft will be controlled during unlinked operation, before the pilot actually initiates such unlinked operations. An advantage of the foregoing arrangement is that the controls for all three axes can be more intuitive and can accordingly reduce the time required by the pilot to become proficient in the use of the controls.

Another feature of an embodiment of the mode control panel 130 described above is that the current targets to which the aircraft is flying can be displayed in a continuous manner, simultaneously with displaying current mode information. An advantage of this feature is that the operator can consistently locate current target information at the same location within the flight deck. Accordingly, the operator's workload can be reduced.

Still another feature of an embodiment of the mode control panel 130 described above is that the lateral motion, vertical motion, and airspeed of the aircraft are displayed sequentially (e.g., from left to right). An advantage of this arrangement is that this ordering is consistent with the order in which instructions are conventionally relayed to the operator by air traffic control (ATC). Accordingly, the operator can easily view and/or modify the control information while receiving instructions from air traffic control, without having to visually skip over various portions of the mode control panel 130. Instead, the operator can move his or her eyes and/or hand in a serial fashion from one display portion to the next as the instructions are received.

Figure 12:
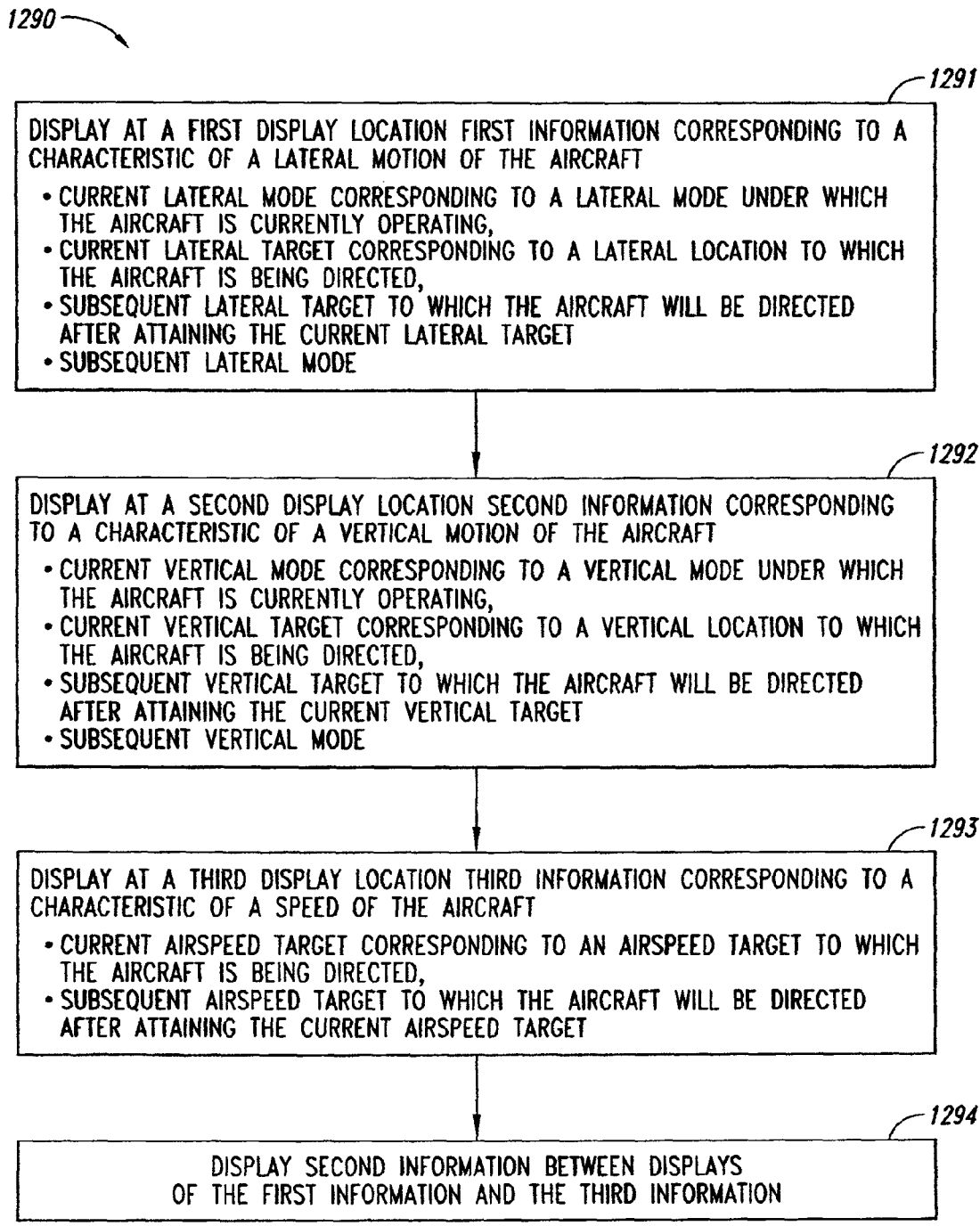
FIG. 12 is a flow diagram illustrating a method for arranging and displaying flight control information in accordance with another embodiment of the invention.

FIG. 12 illustrates a process corresponding to the manner of operation described just above. The process 1290 can include displaying at a first display location first information corresponding to a characteristic of a lateral motion of the aircraft (process portion 1291), displaying at a second display location second information corresponding to a characteristic of a vertical motion of the aircraft (process portion 1292), and displaying at a third display location third information corresponding to a characteristic of a speed of the aircraft (process portion 1293). The second information can be displayed between the displays of the first information and the third information (process portion 1294). In a particular aspect of this embodiment, displaying the first information (process portion 1291) can include displaying a lateral mode under which the aircraft is currently operating, displaying a lateral target corresponding to the lateral location to which the aircraft is automatically being directed, displaying a subsequent lateral target to which the aircraft will be automatically directed after attaining the current lateral target, and (in a particular embodiment) displaying a subsequent lateral mode. In a generally similar manner, displaying the second information can include displaying current vertical mode information, current vertical target information, and subsequent vertical target information (and/or mode), and displaying the third information can include displaying the current airspeed target and subsequent airspeed target.

Figure 13:
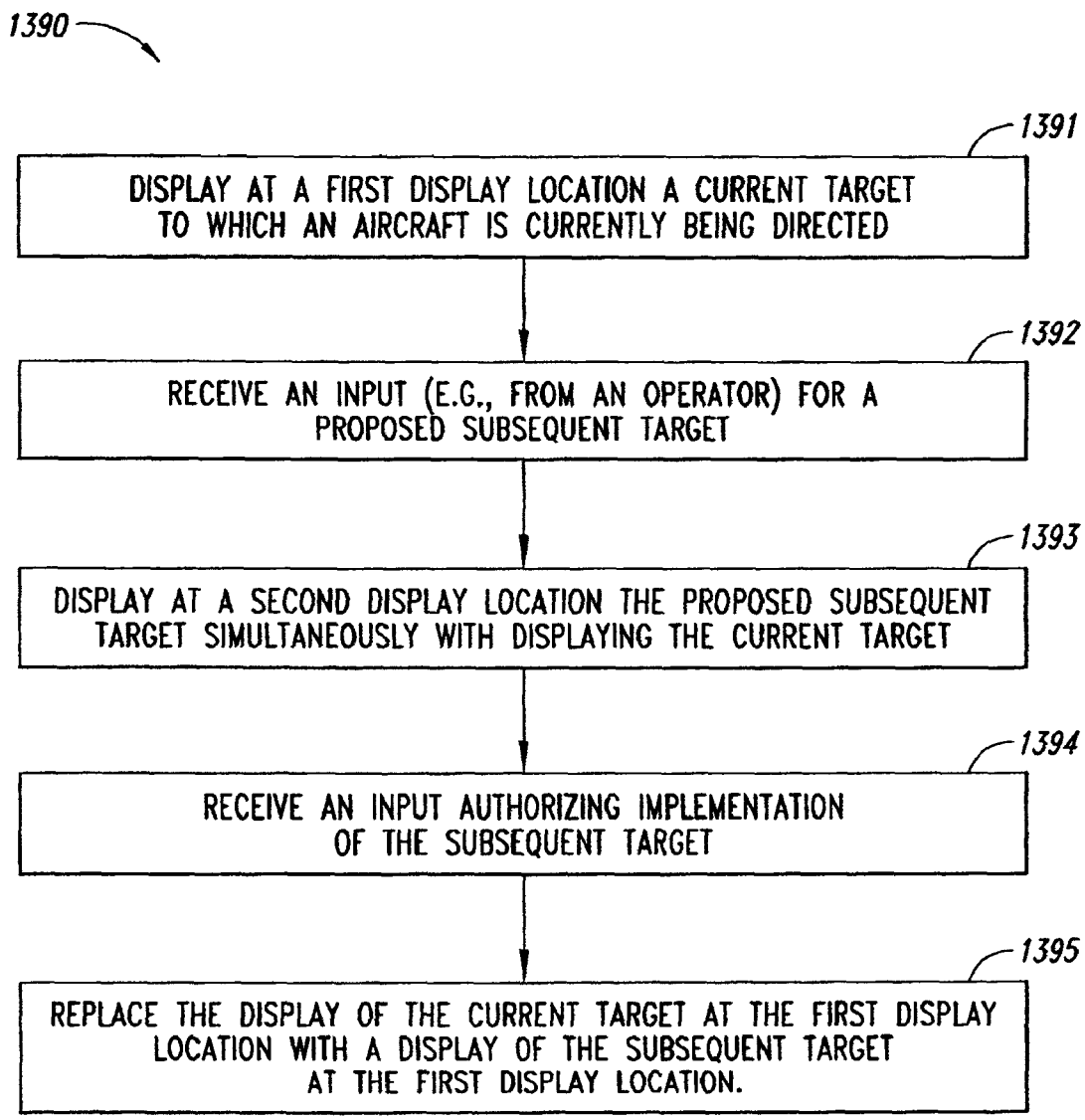
FIG. 13 is a flow diagram illustrating a method for displaying current and proposed subsequent flight control information in accordance with still another embodiment of the invention.

As described above, another feature of the system 100 is that it can allow the operator to preview instructions when controlling the aircraft in an unlinked manner, before committing to having the instructions implemented. FIG. 13 is a flow diagram illustrating a process 1390 corresponding to this arrangement. The process 1390 can include displaying a current target to which the aircraft is currently being directed at a first display location (process portion 1391) and receiving an input for a proposed subsequent target (process portion 1392). The input for the proposed subsequent target can be provided by the operator (e.g., at the mode control panel 130 or the flight management computer 150), or by other sources (e.g., via a datalink). The proposed subsequent target and, optionally the sense of the target can be displayed at a second display location (e.g., at a preview display window) simultaneously with displaying the current target (process portion 1393). In one aspect of this embodiment, the preview display window initially displays the current target, and then updates the value shown as the input is received. In process portion 1394, the process 1390 includes receiving an input authorizing implementation of the subsequent target (e.g., when the pilot presses a button on the mode control panel 130). The display of the current target at the first display location is then replaced with a display of the subsequent target at the first display location (process portion 1395).

An advantage of the arrangement described above with reference to FIG. 13 is that, when the aircraft is operating in an unlinked mode, the pilot can preview the target to which he will subsequently direct the aircraft, while viewing the target to which the aircraft is currently being directed and before committing to the new target. This arrangement can reduce pilot confusion by clearly delineating between a target to which the aircraft is currently being directed and a proposed new target to which the aircraft may or may not subsequently be directed, depending on whether the operator authorizes implementing the new target.

Figure 14A:
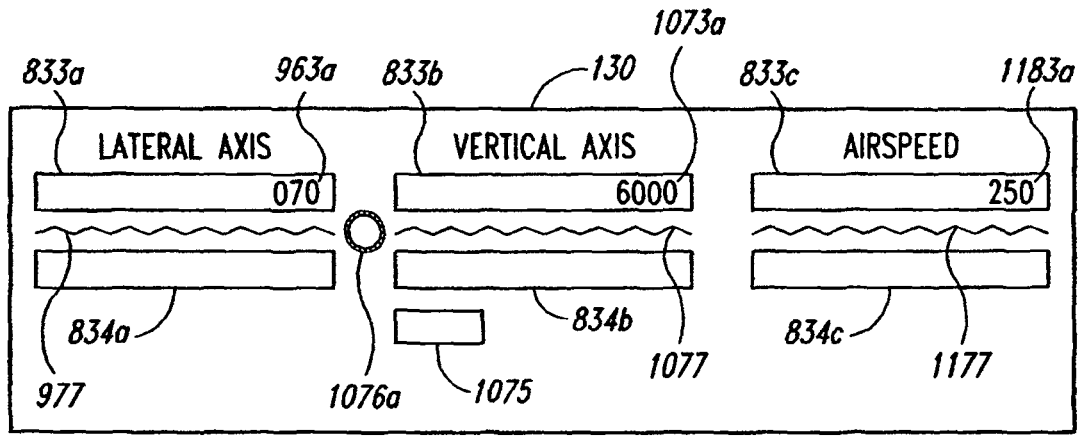
FIGS. 14A-14B are partially schematic illustrations of a mode control panel and flight plan list display, both of which have flight control information displayed in similar manners, in accordance with an embodiment of the invention.
Figure 14A:
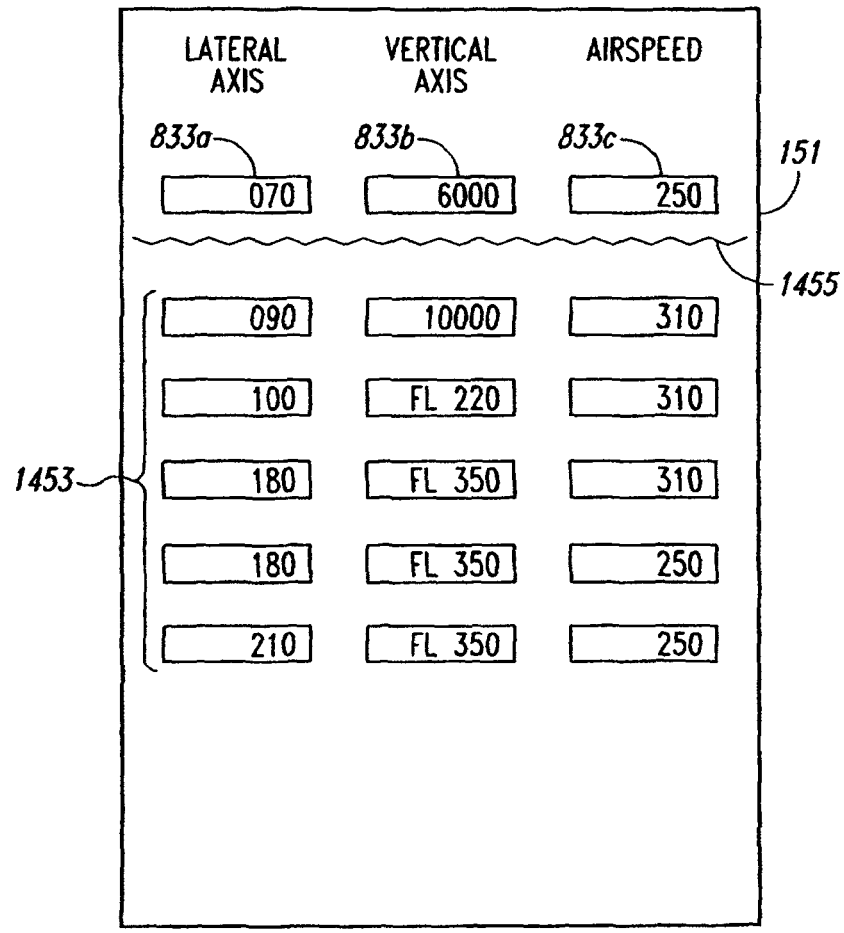

FIG. 14A is a simplified, partially schematic illustration of portions of the mode control panel 130 and the flight plan list display 151, configured to display information during unlinked operation in accordance with an embodiment of the invention. In one aspect of this embodiment, both the mode control panel 130 and the flight plan list display 151 include displays of flight control information arranged in three columns: a first column corresponding to lateral motion, a second column corresponding to vertical motion, and a third column corresponding to the airspeed of the aircraft. The mode control panel 130 displays the current control indicators 833 (shown as current lateral control indicators 833a, current vertical control indicators 833b, and current airspeed control indicators 833c), each of which includes a corresponding current target indicators 963a, 1073a, 1183a, respectively. The mode control panel 130 also displays the next control indicators 834 (shown as next lateral control indicators 834a, next vertical control indicators 834b, and next airspeed control indicators 834c), with no next targets shown because the operation is unlinked. Unlink indicators 977, 1077a and 1177 also highlight the unlinked aspect of the operation.

At least some of the same information (e.g., the targets) displayed on the mode control panel 130 can be presented on the flight plan list display 151. In a particular aspect of this embodiment, the flight plan list display 151 can include the current control indicators 833a, 833b, 833c even if these indicators correspond to instructions input at the mode control panel 130 for unlinked operation. In a particular aspect of this embodiment, information corresponding to linked operation can be visually separated from information corresponding to unlinked operation, e.g., by a marker 1455 or by use of different colors or fonts. The flight plan list display 151 also includes subsequent control indicators 1453 for flight plan legs to be executed subsequently to the current flight plan leg.

Figure 14B:
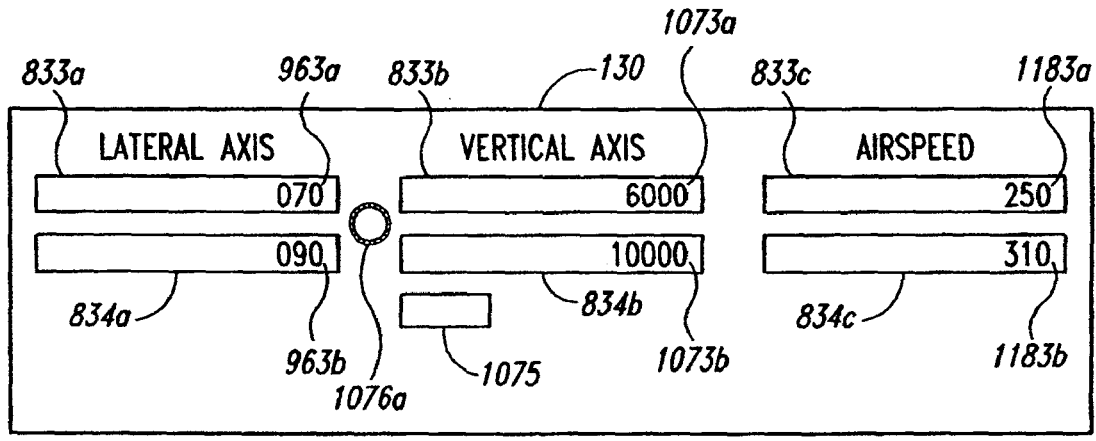
Figure 14B:
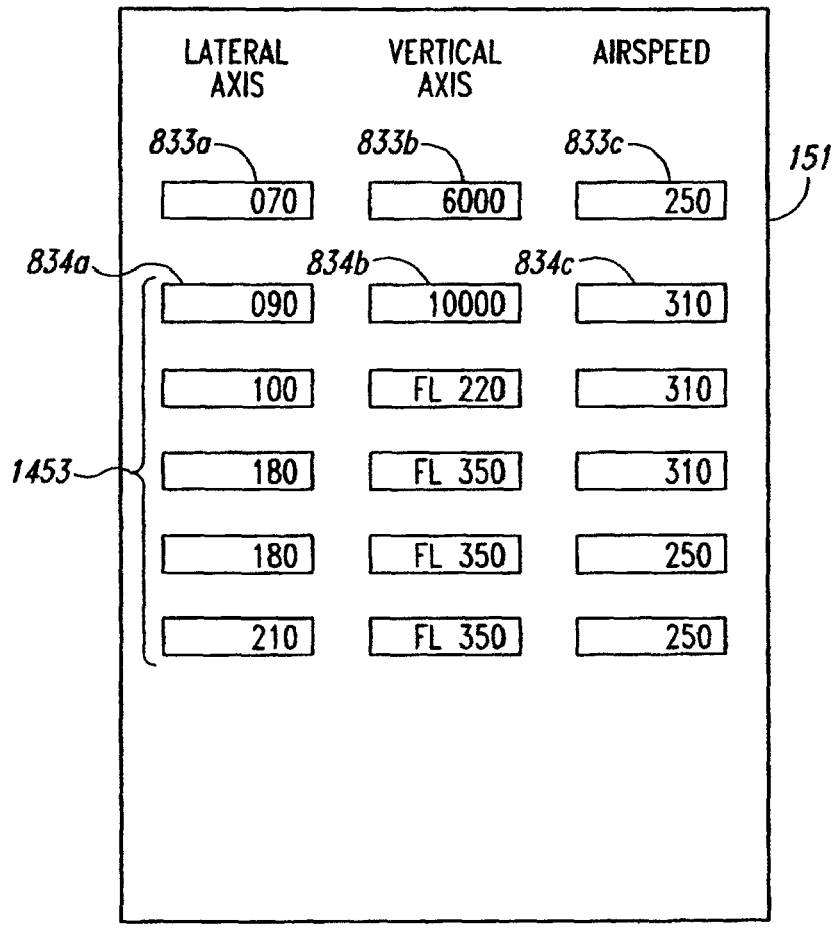

FIG. 14B illustrates the mode control panel 130 and the flight plan list display 151 during linked operation. The unlink indicators 977, 1077, and 1177 (FIG. 14A) are not displayed on the mode control panel 130 while the next targets 963b, 1073b and 1183b are displayed, all of which signifies linked operation. The flight plan list display 151 does not display the marker 1455 (FIG. 14A), which further signifies linked operation.

One feature of an embodiment of the arrangement described above with reference to FIGS. 14A-14B is that the information shown on the mode control panel 130 matches, or at least approximately matches, the information shown on the flight plan list display 151, in organization, content or both. Accordingly, operators need not learn to recognize different indicators (or different ordering of indicators) that may correspond to similar or identical flight control instructions. Another feature of this embodiment is that the operator can see both tactical (unlinked) and strategic (linked) information at the same display.

In yet another embodiment, the aircraft can include an altitude alerting system that is directly coupled to the flight guidance computer 110 (FIG. 2A). Accordingly, the altitude alerting system can be coupled to inputs received by and/or displayed at the mode control panel 130, and/or displayed at the flight plan list display 151. In a particular embodiment, the altitude alerting system can be triggered by deviations from the target altitude (e.g., the current target altitude for a level flight maneuver during climb, descent or cruise), automatically displayed at the flight plan list display 151 and pre-programmed into the flight guidance computer 110. If the current altitude of the aircraft differs from the target altitude by more than predetermined amount, the system can alert the operator, e.g., via a visual and/or aural notification. This is unlike some existing systems where the altitude alerting system is triggered by deviation from an altitude value that is manually input by the operator and displayed at a separate altitude window.

As described above with reference to FIG. 10A, the mode control panel 130 can include a limit altitude display 1075 at which the operator can display clearance limit altitudes (e.g., as imposed by air traffic control) during flight, by rotating the link switch 1076a. Accordingly, the clearance altitude limit can represent an altitude at which the aircraft will level off, e.g., through operation of the flight management computer 150 or the autopilot. The operator can also de-activate the clearance limit by blanking the limit altitude display 1075, which is unlike existing systems, and which allows the operator additional flexibility. In particular, the operator can activate the clearance limit altitude, set the desired value, and deactivate the value when it is no longer used. In one aspect of this embodiment, the aircraft altitude is then controlled by the flight segments pre-programmed into the flight management computer 150. A visual indicator (e.g., the color of the display 1035) can indicate to the operator whether or not the clearance limit is available or active or inactive. In one aspect of this embodiment, this feature is available only during linked operation.

If the clearance limit value represents the next level-off altitude in the flight plan (during climb or descent), it becomes the current vertical target. Accordingly, it is displayed at the current target indicator 1073a on the mode control panel 130 and is also shown at the appropriate line of the flight plan list at the flight plan list display 151. In a particular aspect of this embodiment, the flight segments or legs subsequent to the clearance limit are highlighted to indicate that they are not yet cleared (e.g., by providing a visual separator between cleared and uncleared segments, and/or by providing cleared segments in a different color than uncleared segments).

If the clearance limit value represents a level-off that occurs after the next level-off in the flight plan (during climb or descent), it is shown in the appropriate line of the flight plan list on the flight plan list display 151, and the remaining legs of the flight plan are indicated to be uncleared. As the operator then changes the clearance limit value at the limit altitude display 1075, the flight plan list display 151 is automatically updated to indicate new cleared legs (as appropriate) and the clearance value is inserted into the flight plan list display 151. If the aircraft operation is subsequently unlinked, the clearance limit is deleted and, in one embodiment, is not automatically reinstated if linked operation subsequently is reactivated. An advantage of the foregoing arrangement is that the operator can clearly see by reference to the flight plan list display 151 which legs are cleared and which are not. This arrangement can be particularly useful when a clearance limit results in multiple flight legs being cleared.

From the foregoing, it will be appreciated that specific embodiments of the invention have been described herein for purposes of illustration, but that various modifications may be made without deviating from the spirit and scope of the invention. Additional related embodiments are disclosed in co-pending U.S. application Ser. No. 12/825,135, entitled "Apparatuses and Methods for Displaying and Receiving Tactical and Strategic Flight Guidance Information," filed concurrently herewith and incorporated herein in its entirety by reference. Accordingly, the invention is not limited except as by the appended claims.

We claim:

1. A method for controlling an aircraft system to direct vertical motion of an aircraft, the method comprising:
   receiving a request from an aircraft operator for an aircraft descent when the aircraft is at a first altitude above a threshold altitude; and
   based solely on the request, automatically directing the aircraft to descend to a second altitude along a path that at least approximately minimizes the descent rate of the aircraft.

2. The method of claim 1, wherein the aircraft includes a computer having at least one input device to receive the request.

3. The method of claim 1, wherein the request includes a request to be executed during engine-out operation of the aircraft.

4. The method of claim 1, further comprising specifying the threshold altitude in response to input received from a vertical selector component.

5. The method of claim 4, wherein the vertical selector component is a hardware input device.

6. The method of claim 1, wherein the request is received through a single-purpose hardware control.

7. The method of claim 6, wherein the request is generated based only on the input to the single-purpose hardware control.

8. The method of claim 1, wherein the second altitude is equal to the threshold altitude.

9. The method of claim 1, further comprising:
   initially operating the aircraft automatically in accordance with a flight plan; and
   automatically unlinking a vertical motion axis of the aircraft from the automatic operation in response to the request.

10. A computer-readable medium containing instructions for controlling an aircraft computer system to direct vertical motion of an aircraft, by a method comprising:
    receiving a request from an aircraft operator for an aircraft descent when the aircraft is at a first altitude above a threshold altitude; and
    based solely on the, request, automatically directing the aircraft to descend to a second altitude along a path that at least approximately minimizes the descent rate of the aircraft.

11. The computer-readable medium of claim 10, wherein the request is received from an input device in the aircraft.

12. The computer-readable medium of claim 10, wherein the request includes a request to be executed during engine-out operation of the aircraft.

13. The computer-readable medium of claim 10, the method further comprising specifying the threshold altitude in response to input received from a vertical selector component.

14. The computer-readable medium of claim 10, wherein the request is received through a single-purpose hardware control.

15. The computer-readable medium of claim 14, wherein the request is generated based only on the input to the single-purpose hardware control.

16. The computer-readable medium of claim 10, wherein the second altitude is equal to the threshold altitude.

17. The computer-readable medium of claim 10, further comprising:
    initially operating the aircraft automatically in accordance with a flight plan; and
    automatically unlinking a vertical motion axis of the aircraft from the automatic operation in response to the request.

18. A system for controlling an aircraft system to direct vertical motion of an aircraft, comprising:
    a vertical selector component configured to receive a target altitude;
    a drift down selector component configured to receive a request from an aircraft operator for an aircraft descent when the aircraft is at a first altitude above a threshold altitude; and
    an aircraft control component configured to automatically direct the aircraft to descend to the target altitude along a path that at least approximately minimizes the descent rate of the aircraft, based solely on the received request.

19. The system of claim 18, wherein the drift down selector component is a single-purpose hardware control.

20. The system of claim 18, wherein when the aircraft is initially operating automatically in accordance with a flight plan, the aircraft control component is further configured to automatically unlink a vertical motion axis of the aircraft from the automatic operation in response to the request.

* * * * *